(12) United States Patent
Grinham et al.

(10) Patent No.: US 11,305,235 B2
(45) Date of Patent: Apr. 19, 2022

(54) HYDROPHOBIC BARRIER LAYER FOR CERAMIC INDIRECT EVAPORATIVE COOLING SYSTEMS

(71) Applicant: President and Fellows of Harvard College, Cambridge, MA (US)

(72) Inventors: Jonathan L. Grinham, Cambridge, MA (US); Jack Alvarenga, Quincy, MA (US); Martin Bechthold, Cambridge, MA (US); Joanna Aizenberg, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 17/282,733

(22) PCT Filed: Oct. 2, 2019

(86) PCT No.: PCT/US2019/054230
§ 371 (c)(1),
(2) Date: Apr. 2, 2021

(87) PCT Pub. No.: WO2020/072597
PCT Pub. Date: Apr. 9, 2020

(65) Prior Publication Data
US 2021/0308625 A1 Oct. 7, 2021

Related U.S. Application Data

(60) Provisional application No. 62/740,221, filed on Oct. 2, 2018.

(51) Int. Cl.
*B01D 53/22* (2006.01)
*B01D 63/06* (2006.01)
(Continued)

(52) U.S. Cl.
CPC ....... *B01D 63/066* (2013.01); *B01D 67/0041* (2013.01); *B01D 67/0048* (2013.01);
(Continued)

(58) Field of Classification Search
CPC ............ B01D 67/0088; B01D 2325/38; B01D 67/0048; B01D 2325/08; B01D 2325/06;
(Continued)

(56) References Cited

U.S. PATENT DOCUMENTS

| | | |
|---|---|---|
| 2003/0033821 A1 | 2/2003 | Maisotsenko et al. |
| 2011/0302946 A1 | 12/2011 | Gilbert |
| 2011/0312080 A1* | 12/2011 | Hatton .................... C04B 38/04 435/289.1 |
| 2013/0244001 A1 | 9/2013 | Wang et al. |

(Continued)

FOREIGN PATENT DOCUMENTS

CN 101629743 B 6/2011

OTHER PUBLICATIONS

International Search Report and Written Opinion dated Jan. 6, 2020, in the International Application No. PCT/US19/54230. 11 pages.

*Primary Examiner* — Anthony R Shumate
(74) *Attorney, Agent, or Firm* — Wilmer Cutler Pickering Hale and Dorr LLP

(57) ABSTRACT

An evaporative cooling system includes a porous ceramic body with a plurality of dry channels and a plurality of wet channels. The plurality of dry channels are configured to inhibit transfer of water vapor into the dry channels and include a barrier layer that includes a roughened layer with a features size less than 1000 nm and a hydrophobic chemical modification disposed on the roughened layer. The plurality of wet channels are configured to allow transfer of water vapor.

24 Claims, 20 Drawing Sheets

(51) Int. Cl.
*B01D 67/00* (2006.01)
*B01D 69/02* (2006.01)
*B01D 71/02* (2006.01)
*F24F 3/14* (2006.01)

(52) U.S. Cl.
CPC ..... *B01D 67/0088* (2013.01); *B01D 67/0093* (2013.01); *B01D 69/02* (2013.01); *B01D 71/024* (2013.01); *F24F 3/14* (2013.01); *B01D 2325/06* (2013.01); *B01D 2325/08* (2013.01); *B01D 2325/38* (2013.01); *F24F 2003/1435* (2013.01)

(58) Field of Classification Search
CPC .. B01D 63/066; B01D 67/0041; B01D 69/02; B01D 71/024; B01D 67/0093; F24F 3/14; F24F 2003/1435
See application file for complete search history.

(56) References Cited

U.S. PATENT DOCUMENTS

| | | | |
|---|---|---|---|
| 2014/0038859 A1* | 2/2014 | Skala | C04B 35/195 |
| | | | 507/269 |
| 2014/0147627 A1* | 5/2014 | Aizenberg | A61L 15/24 |
| | | | 428/141 |
| 2014/0342954 A1 | 11/2014 | Ingber et al. | |
| 2016/0081281 A1* | 3/2016 | Horinek | A01G 13/0256 |
| | | | 47/1.01 R |
| 2018/0118957 A1* | 5/2018 | Brown | C09D 123/12 |
| 2018/0125066 A1* | 5/2018 | Bassler | C12Q 1/18 |
| 2019/0124864 A1* | 5/2019 | Bassin | A01H 6/28 |
| 2019/0203425 A1* | 7/2019 | Sawyer | E01C 13/083 |
| 2019/0246591 A1* | 8/2019 | Leo | A01K 67/033 |
| 2020/0102707 A1* | 4/2020 | Keyser | B27L 11/02 |
| 2020/0229411 A1* | 7/2020 | Leo | A23J 1/00 |
| 2020/0291246 A1* | 9/2020 | Aizenberg | A61L 33/064 |
| 2020/0370073 A1* | 11/2020 | Leo | A61K 8/9789 |
| 2021/0137137 A1* | 5/2021 | Leo | B01D 5/006 |

* cited by examiner

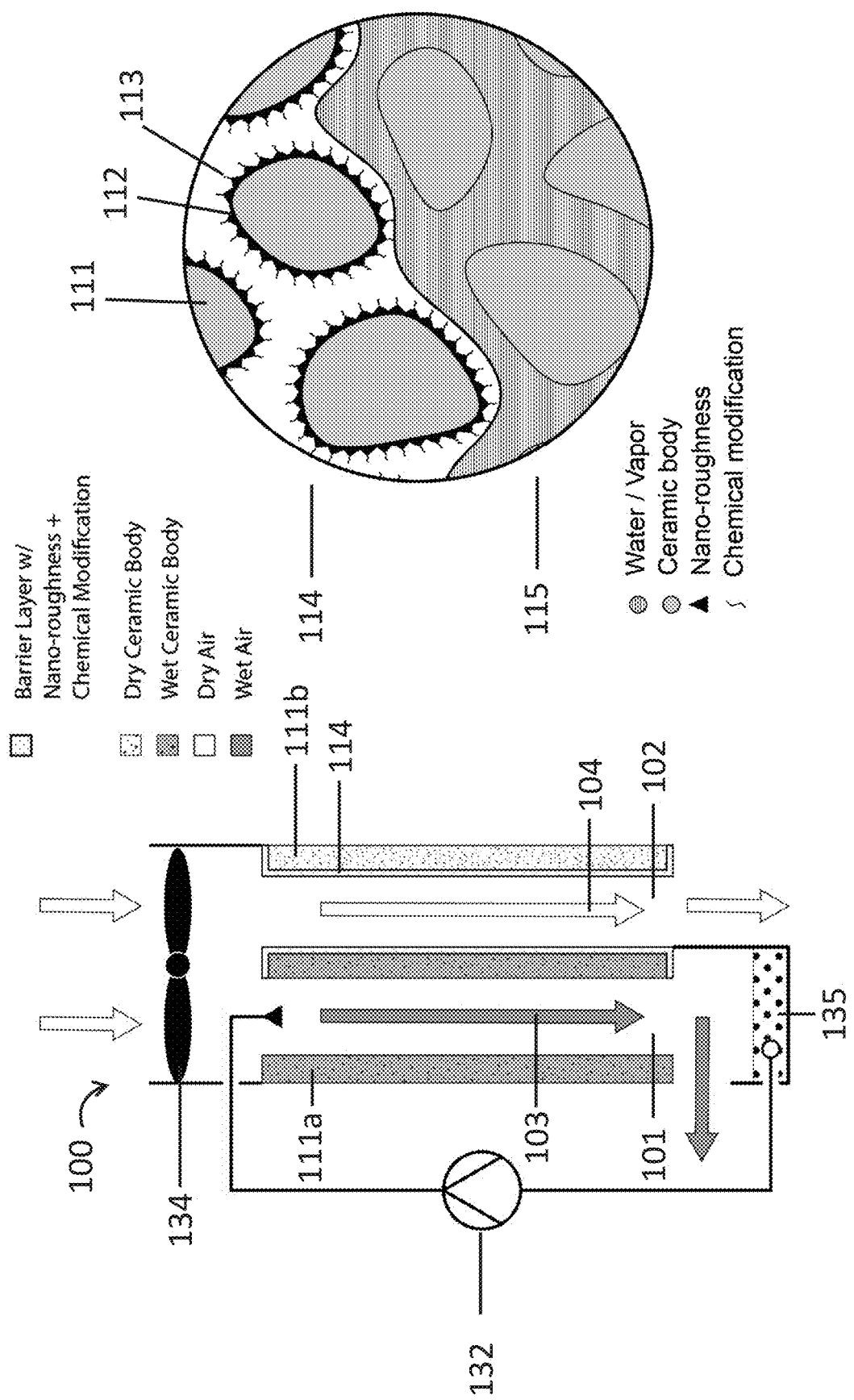

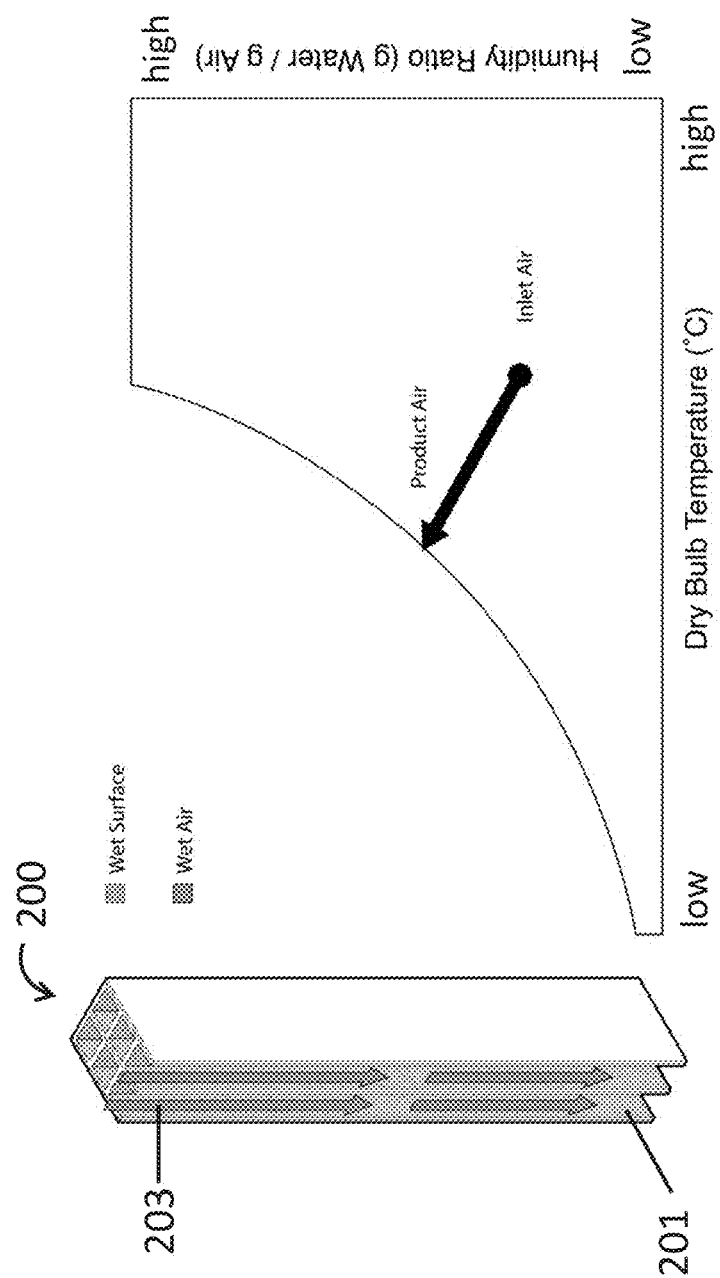

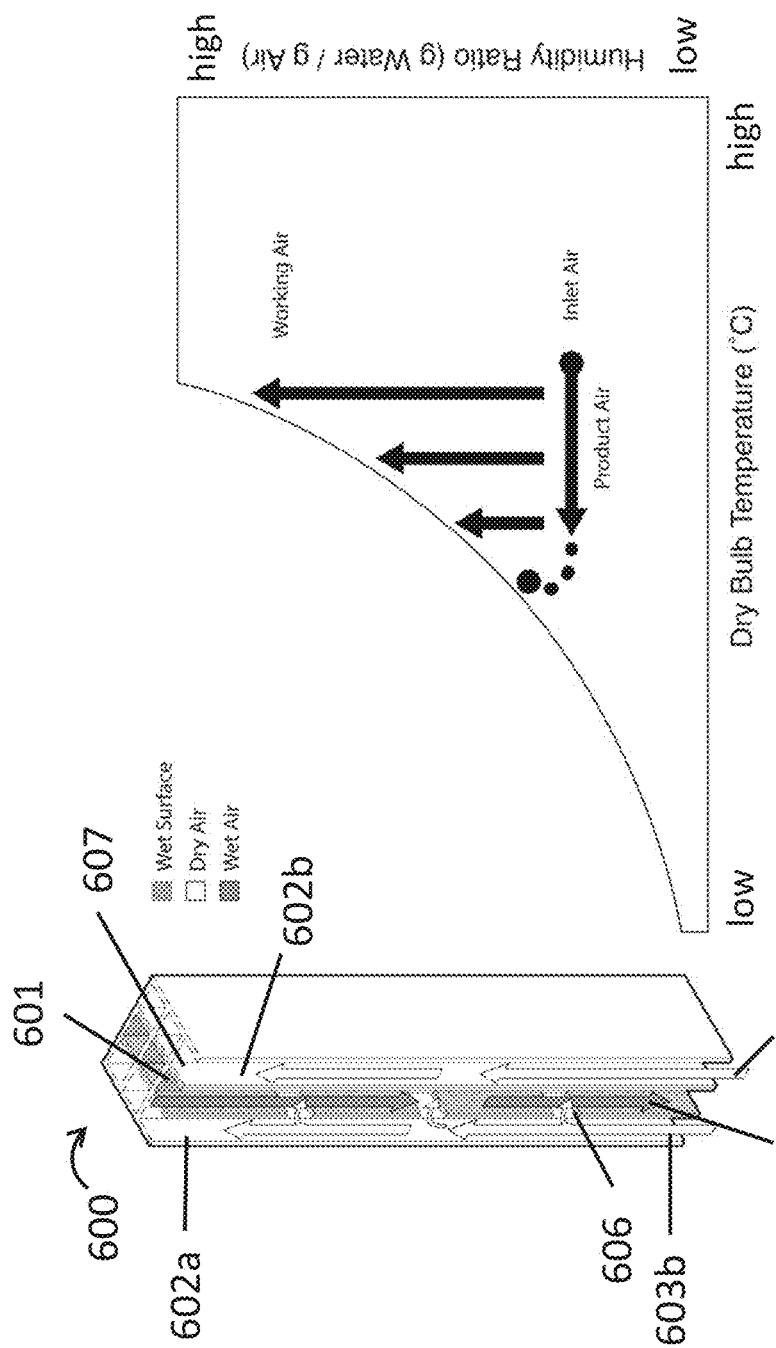

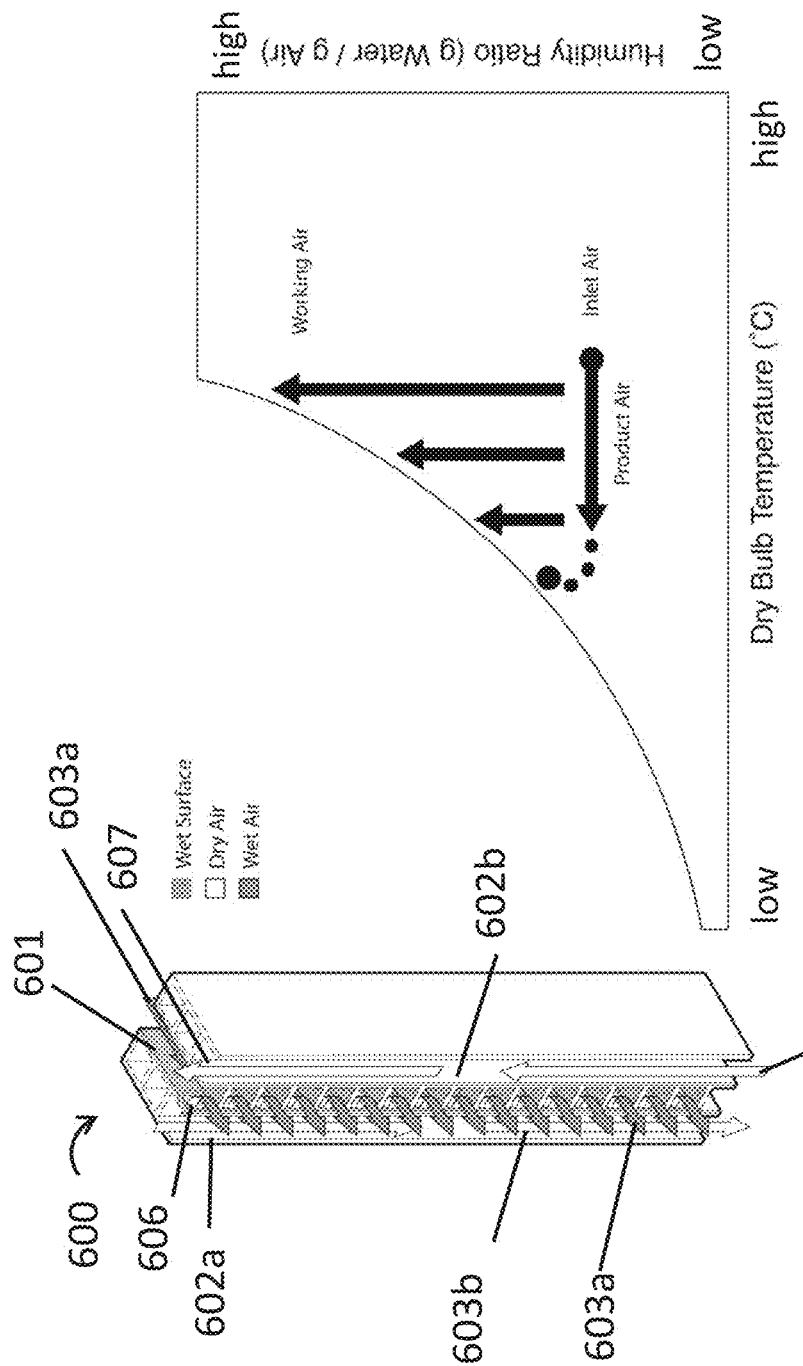

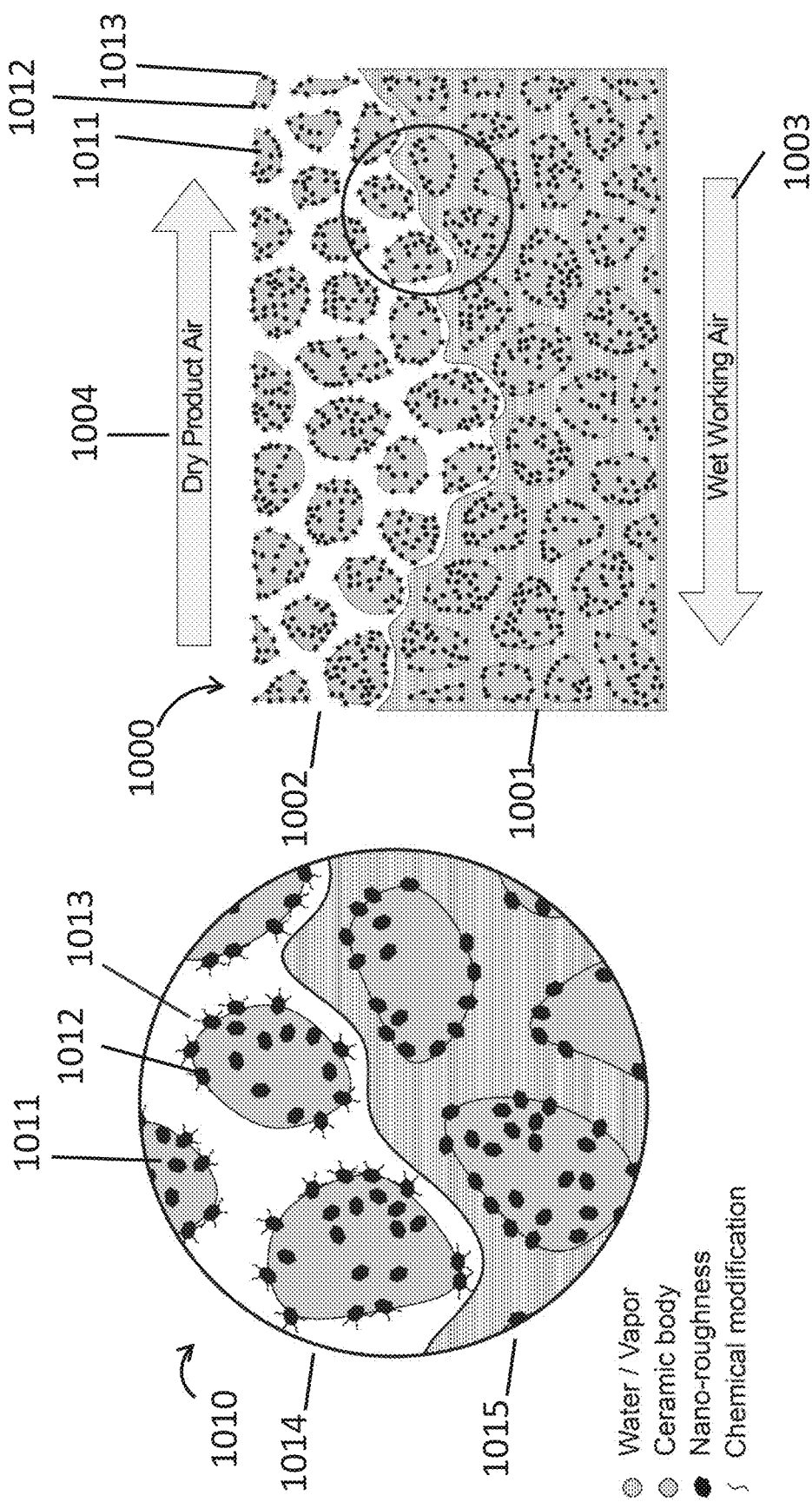

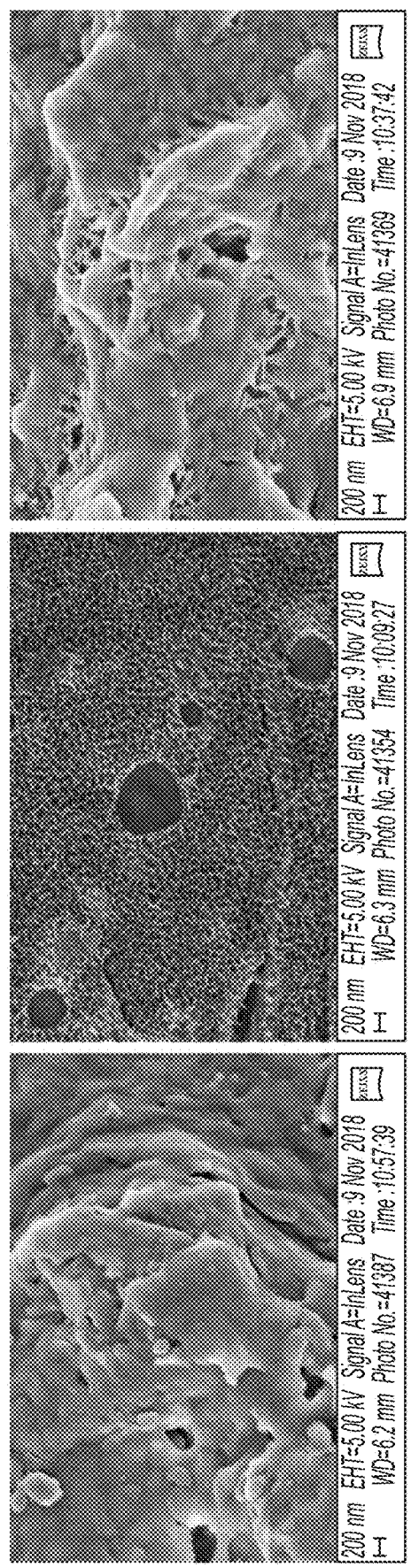

HYDROPHOBIC BARRIER LAYER FOR CERAMIC INDIRECT EVAPORATIVE COOLING SYSTEMS

CROSS-REFERENCES TO RELATED APPLICATIONS

This application is a National Stage Entry of PCT International Application No. PCT/US2019/054230, filed on Oct. 2, 2019, which claims priority to U.S. Provisional Patent Application No. 62/740,221, filed on Oct. 2, 2018, the contents of each of which are hereby incorporated by reference in their entireties.

COPYRIGHT NOTICE

This patent disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

This application relates to systems for evaporative cooling. In particular this application relates to systems for evaporative cooling with superhydrophobic surfaces.

BACKGROUND

Evaporative cooling uses thermal energy (i.e., heat) contained in air to evaporate water. The large enthalpy associated with phase change of water (i.e., latent heat of vaporization) can produce a sizeable temperature drop, as thermal energy from ambient air (i.e., sensible heat) is used for liquid-to-vapor phase change. The air temperature or dry-bulb temperature is reduced while the wet-bulb temperature remains nearly unchanged as the moisture content or humidity of the air increases. For dry, high temperature climates, the added moisture content can be beneficial for thermal comfort, for example, for re-hydration of skin and the respiratory system.

The cooling capacity of evaporative cooling systems depends on wet-bulb depression, which is defined as the difference between the dry-bulb and wet-bulb temperature. Therefore, in dry, arid climates evaporative cooling has a higher cooling capacity potential and can provide reduced primary energy demand compared to compressor-based air conditioning systems. For climates with higher humidity, the added humidity can increase user discomfort. Instead, indirect evaporative cooling systems can be used to avoid directly adding humidity to the conditioned space.

SUMMARY

In some embodiments, an evaporative cooling system includes a porous ceramic body with a plurality of dry channels configured to inhibit transfer of water vapor into the dry channels and including a roughened layer with a features size less than 1000 nm and a hydrophobic chemical modification disposed on the roughened layer; and a plurality of wet channels configured to allow transfer of water vapor.

In some embodiments, the plurality of dry channels and the plurality of wet channels have a configuration selected from the group consisting of parallel-flow, counter-flow, and cross-flow.

In some embodiments the evaporative cooling system is an indirect evaporative cooling system.

In some embodiments, the indirect evaporative cooling system is a regenerative indirect evaporative cooling system, a dew-point indirect evaporative cooling system, or a Maisotsenko indirect evaporative cooling system.

In some embodiments, the porous ceramic body includes oxides, composites, clay bodies, stoneware, earthenware, porcelain, bone china, or combinations thereof.

In some embodiments, the oxide includes alumina, silica, titania, beryllia, ceria, zirconia, manganese oxide, iron oxide, or combinations thereof.

In some embodiments, the composite includes particle-reinforced composites, fiber-reinforced composites, combinations of oxides and non-oxides, and combinations thereof.

In some embodiments, the porous ceramic body has a pore size between 10 nm and 1000 nm.

In some embodiments, the porous ceramic body has a pore size between 1 µm and 1000 µm.

In some embodiments, the porous ceramic body has a pore volume of 1 to 80 percent.

In some embodiments, the roughness of the roughened layer is between 0.1 nm and 1000 nm.

In some embodiments, the roughness of the roughened layer is between 0.1 nm and 100 nm.

In some embodiments, the roughness of the roughened layer is between 100 and 1000 nm.

In some embodiments, the roughened layer includes alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide, aluminum oxyhydroxide, or combinations thereof.

In some embodiments, the roughened layer includes a sol-gel coating.

In some embodiments, the roughened layer includes a dispersion of metal oxide particles.

In some embodiments, the metal oxide particles have a diameter of 2 nm to 20 µm.

In some embodiments, the metal oxide particles have a diameter of 2 nm to 10 nm.

In some embodiments, the metal oxide particles have a diameter of 10 nm to 50 nm.

In some embodiments, the metal oxide particles have a diameter of 50 nm to 200 nm.

In some embodiments, the metal oxide particles are polydisperse.

In some embodiments, the metal oxide particles include alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide, or combinations thereof.

In some embodiments, the roughened layer has a thickness of 100 nm to 5 mm.

In some embodiments, the roughened layer has a penetration depth of 200 nm to 5 mm.

In some embodiments, the roughened layer includes an overlayer with a thickness of 100 nm to 500 µm.

In some embodiments, the hydrophobic chemical modification includes organic silane or thiol molecules terminated with either methyl groups, aryl groups, branched alkyl chains, linear alkyl chains, perfluorinated chains, or hydrophobic polymers, siloxanes, alkyl-phosphates, alkyl phosphoric acid esters, alkane-phosphonic acids, alkane-phosphonic esters, alkane-hydroxamic acids, alkane-carboxylic acids, or combinations thereof.

In some embodiments, the hydrophobic chemical modification includes fatty acids, natural waxes, synthetic waxes, and combinations thereof.

In some embodiments, the hydrophobic chemical modification is covalently attached to the roughened layer.

In some embodiments, the hydrophobic chemical modification is adsorbed to the roughened layer.

In some embodiments, the hydrophobic chemical modification has a thickness of 2 nm to 1 µm.

In some embodiments, the evaporative cooling system is integrated into an exterior wall of a building.

In some embodiments, the evaporative cooling system is integrated into a roof of a building.

In some embodiments, the evaporative cooling system is integrated into an interior of a building.

In some embodiments, the evaporative cooling system is a stand-alone unit.

In some embodiments, the evaporative cooling system cools an interior space.

In some embodiments, the evaporative cooling system cools an exterior space.

In some embodiments, the evaporative cooling system includes a water reservoir.

In some embodiments, the evaporative cooling system includes a pump.

In some embodiments, the evaporative cooling system includes a fan configured to draw air through the porous ceramic body.

In some embodiments, the evaporative cooling system includes misters, ultrasonic misters, atomizing spray nozzles, spray nozzles and combinations thereof.

In some embodiments, a method of making an evaporative cooling system includes providing a porous ceramic body, forming a roughened layer with a feature size less than 1000 nm within a first region of the porous ceramic body, and chemically modifying the roughened layer within the first region.

In some embodiments, the method includes forming the roughened barrier layer within a second region of the porous ceramic body.

In some embodiments, providing the porous ceramic body includes forming the ceramic according to a method including extrusion, co-extrusion, pressing, casting, foams, additive manufacturing, and multi-material additive manufacturing.

In some embodiments co-extrusion further includes depositing a first formulation of the porous ceramic body and components of the roughened layer from a first extrusion head in a first region, depositing a second formulation of the porous ceramic from a second extrusion head in a second region.

In some embodiments, co-extrusion further includes depositing a formulation of the porous ceramic body and components of the roughened layer from an extrusion head, wherein the formulation has a composition that varies temporally during said depositing.

In some embodiments, the roughened layer includes alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide, aluminum oxyhydroxide, or combinations thereof.

In some embodiments, forming the roughened layer includes dissolving a sol-gel precursor in an organic solvent, initiating a hydrolysis reaction to form a network gel, applying the network gel to the porous ceramic body, and heating the porous ceramic body.

In some embodiments, forming the roughened layer includes providing metal oxide particles.

In some embodiments, the method includes providing the metal oxide particles in the sol-gel precursor before dissolving the sol-gel precursor in the organic solvent.

In some embodiments, the method includes providing the metal oxide particles in the sol-gel precursor after dissolving the sol-gel precursor in the organic solvent.

In some embodiments, the method includes providing the metal oxide particles during the hydrolysis reaction.

In some embodiments, the method includes densifying and recrystallizing the network gel by a hydrothermal reaction.

In some embodiments, forming the roughened layer includes applying a dispersion of metal oxide particles to the porous ceramic body.

In some embodiments, applying a dispersion of metal oxide particles includes wash-coating, spray coating, dip coating, or painting.

In some embodiments, chemically modifying the roughened layer includes covalently attaching a molecule to the roughened layer.

In some embodiments, the molecule includes alkyl chains, perfluorinated chains, siloxanes, alkyl-phosphates, alkyl-phosphates, alkyl phosphoric acid esters, alkane-phosphonic acids/esters, alkane-hydroxamic acids, alkane-carboxylic acids, thiols, or combinations thereof.

In some embodiments, chemically modifying the roughened layer includes adsorbing a molecule to the roughened layer.

In some embodiments, the molecule includes fatty acids, natural waxes, synthetic waxes, and combinations thereof.

BRIEF DESCRIPTION OF THE DRAWINGS

The objects and advantages will be apparent upon consideration of the following detailed description, taken in conjunction with the accompanying drawings, in which like reference characters refer to like parts throughout, and in which:

FIG. 1A illustrates an evaporative cooling system that includes a superhydrophobic roughened ceramic, in accordance with certain embodiments.

FIG. 1B illustrates a superhydrophobic roughened ceramic, in accordance with certain embodiments.

FIG. 2A illustrates a parallel direct cooling configuration, in accordance with certain embodiments.

FIG. 2B illustrates the resulting theoretical psychrometric cooling of a parallel direct cooling configuration, in accordance with certain embodiments.

FIG. 6A illustrates an M-cycle-like evaporative cooling system in a counterflow configuration, in accordance with certain embodiments.

FIG. 6B illustrates the resulting theoretical psychrometric cooling of an M-cycle-like evaporative cooling system in a counterflow configuration, in accordance with certain embodiments.

FIG. 6C illustrates an M-cycle-like evaporative cooling system in a crossflow configuration, in accordance with certain embodiments.

FIG. 6D illustrates the resulting theoretical psychrometric cooling of an M-cycle-like evaporative cooling system in a crossflow configuration, in accordance with certain embodiments.

FIG. 10A illustrates a porous ceramic body with chemical modification and a roughened layer introduced via a particle dispersion, in accordance with certain embodiments.

FIG. 10B illustrates transport of wet working air in untreated regions of a porous ceramic body and transport of dry product air in regions of a porous ceramic body with chemical modification and a roughened layer, in accordance with certain embodiments.

FIG. 16A shows an SEM image of an untreated terracotta tile, in accordance with certain embodiments.

FIG. 16B shows an SEM image of a terracotta tile with a sol-gel boehmite coating with nanoscale roughness, in accordance with certain embodiments.

FIG. 16C shows an SEM image of a terracotta tile with an alumina nanoparticle dispersion, in accordance with certain embodiments.

DETAILED DESCRIPTION

Figures 3A, 3B:
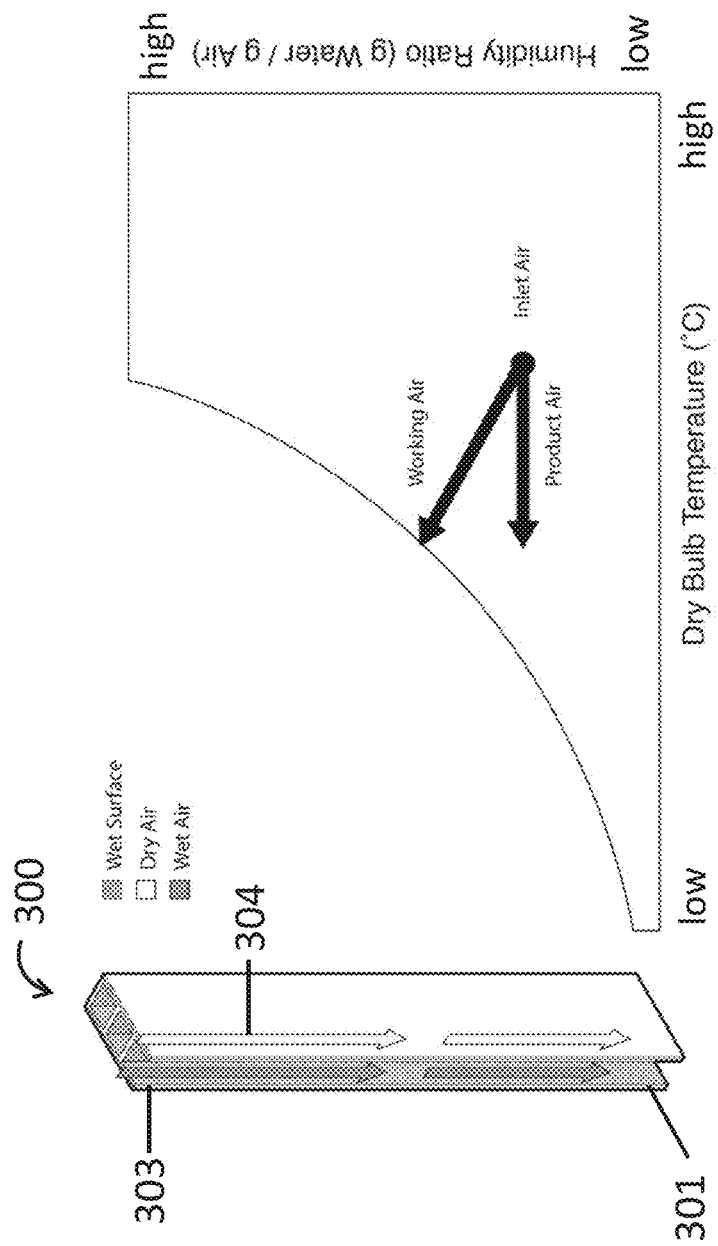
FIG. 3A illustrates a parallel indirect cooling configuration, in accordance with certain embodiments.
FIG. 3B illustrates the resulting theoretical psychrometric cooling of a parallel indirect cooling configuration, in accordance with certain embodiments.

In one embodiment, shown in FIG. 1A, an evaporative cooling system 100 includes a plurality of dry channels, a plurality of wet channels, a superhydrophobic roughened ceramic, a reservoir 135, and a pump 132. In some embodiments, an evaporative cooling system includes a fan 134. In some embodiments, shown in FIG. 1B, a superhydrophobic roughened ceramic includes (i) a bulk porous ceramic body 111 with (ii) a roughened layer 112 and (iii) a hydrophobic chemical modification 113. In certain embodiments, the roughened layer 112 can have a feature size that is less than 1000 nm. In other embodiments, the roughened layer 112 can have a feature size that is less than 500 nm, 100 nm, 50 nm, 10 nm, 1 nm, 0.1 nm, and the like. The combination of (ii) and (iii) can be referred to as a "superhydrophobic coating" or barrier layer 114. In embodiments, shown in FIG. 1A, the barrier layer 114 is disposed in or on the dry channels 102. In some embodiments, the untreated regions 115 of the porous ceramic form the wet channels 101. In some embodiments, dry product air 104 flows through the dry channels 102 and wet working air 103 flows through the wet channels 101. In some embodiments, the porous ceramic body 111 includes regions of wet ceramic porous body 111a adjacent to the wet channels 101 and regions of dry porous ceramic body 111b adjacent to the dry channels 102.

I. Evaporative Cooling Systems

In some embodiments, indirect evaporative cooling systems use an evaporative cooling mechanism but separate the humid airflow produced by evaporation (the "working", "wet", "process", or "secondary" air flow or stream) from the air entering a space (the "product", "dry", "supply", or "primary" air flow or stream). In some embodiments, working air flows through wet channels and product air flows through dry channels. In some embodiments, the dry channels include a barrier layer that includes a roughened layer and a hydrophobic chemical modification. In embodiments related to indirect evaporative cooling, sensible cooling energy produced through evaporation in the working air is exchanged with the product air using a heat exchange media (or surface). In some embodiments, the heat exchange media is a porous ceramic element. In some embodiments, the evaporative cooling system cools an interior space. In some embodiments, the evaporative cooling system cools an exterior space. The cooled dry product air enters the space while the wet working air is kept separate from the area to be cooled. In an ideal heat exchange system with balanced air flow rates and infinite contact area, the dry product air temperature can be reduced to the wet-bulb temperature of the working wet stream. In some embodiments, indirect evaporative cooling (IEC) systems can provide further cooling efficiency improvement over direct evaporative cooling systems (30-50%) by incorporating multi-stage heat exchanging elements with vapor separation. In some embodiments, an evaporative cooling system can have many counterflow and crossflow "regenerative" designs, including the Maisotsenko, or M-cycle, cooling systems. In some embodiments, these and similar systems use a series of wet and dry channels to decrease the primary air temperature to the inlet air wet-bulb temperature and can further increase cooling below inlet air wet-bulb temperatures, further increasing cooling efficiency. In these embodiments, the product air remains at a low relative humidity, allowing comfortable perspiration, further increasing the perception of cooling. Laboratory testing and pilot field studies have shown that actual efficiencies, defined by the dry-bulb efficiency, for direct and indirect systems are near 50-60% and 70-95%.

One advantage of a multi-staged IEC is its ability to achieve cooler supply air temperatures (below working air wet-bulb) than traditional evaporative cooling units (up to 30% colder), which extends the range of applicable climate zones, improves thermal comfort, and displaces more heat-pump based or mechanical cooling. The increased performance over direct evaporative cooling units comes at a fraction of the energy use and energy cost of mechanical air conditioning because IEC systems only use electrical energy for moving air and water. Furthermore, an indirect evaporative cooling system can provide improved ventilation rates compared to mechanical air conditioning, which reduces strain on and investment in power distribution grids, and reduces harmful, high global warming potential refrigerant gases.

A. Types of Evaporative Cooling Systems

1. Façade and Roof

In some embodiments, an IEC system can be integrated within or attached to an exterior wall or/and roof of a building. In some embodiments, the evaporative cooling system cools an interior space. In some embodiments, the evaporative cooling system cools an exterior space. In some embodiments, the IEC system can be integrated within a ventilated cladding or roof system. In this embodiment, the wet channels of the IEC system can be integrated as surfaces, plates, channels or other configurations within a cladding material and hung, clipped, or fastened to a substructure on the exterior of the wall or roof sheathing. In some embodiments, the interior face of the cladding material is coated with a vapor barrier or similar. A vapor barrier is any material, film, sheet, foil, or other material that prohibits, slows, or resists the diffusion or transfer of water vapor (i.e., moisture) through its body. Impermeable vapor barriers exhibit a US perm<1 (SI Perm<57). Semi-permeable vapor barriers exhibit a US perm 1-to-10 (SI Perm 57-to-570). Permeable vapor barriers exhibit a US perm>10 (SI Perm>570). In some embodiments, the exterior face of the wall or roof sheathing is coated with a vapor membrane or similar coating. In some embodiments, the space or cavity formed between the exterior cladding material and the wall or roof sheathing forms the dry channel of the IEC system. In the wet channel, air flows through the channel and is exhausted to the outside of the building by means of buoyancy or wind driven flows or by means of a blower fan. In the dry channel, air flows through the channel and into the building by means of negative pressure generated by buoyancy or wind driven flows within the building, by means of negative pressure generated by a blower fan located within the building, or means of positive or negative pressure generated blower fan at the exterior of dry channel cavity. In some embodiments, air flows into the building by means of a duct placed through the wall or roof.

In some embodiments, water is supplied to the wet channels by a pump. In some embodiments, water is supplied to and wets the surfaces of the wet channels of the exterior cladding material by means of a pump with sprayer nozzle. In other embodiments, the wet channels are placed in a water filled sump and the wet channels are wetted by means of capillary forces. In some embodiments, un-evaporated and run-off water is collected in a sump below the wet channels, and water from the sump is then recirculated to the spray nozzles. In some embodiments, make-up water is supplied to the sump using the building plumbing system, rainwater collection, or other means. In some embodiments, flow valves are used to control water flow. In some embodiments, flow valves are used to control outlet air flow and/or to mix untreated outdoor air with treated product air.

In other embodiments, the IEC system can be attached as a stand-alone unit separate from, on top of, or next to a cladding system. In this embodiment, the wet and dry channels of the IEC system can be integrated as surfaces, plates, channels, or other geometries in parallel-, counter-flow-, regenerative-, dewpoint, or M-cycle-IEC heat exchanger configurations within a cladding material and hung, clipped, or fastened directly to the wall or roof sheathing or onto a substructure on the exterior of the wall or roof sheathing. For both the wet and dry channels, air flow can be generated by positive or negative pressure from a blower fan attached to the channels of the IEC system. In some embodiments, the air in the dry channels is separated from the air in the wet channels by a manifold. In some embodiments, air flows directly from the dry channel into the building by means of a duct placed through the wall, while air from the wet channel is exhausted outside the building. In some embodiments, flow valves are used to control outlet air flow and/or to mix untreated outdoor air with treated product air. In other embodiments, such as regenerative-, dewpoint-, and M-cycle-IEC system a portion of the dry product air can be separated from product air entering the building by means of a manifold or periodic outlets. In these embodiments the portion of the dry product air separated from the product air entering the building is redirected into the wet channel to be used as the wet working air where it is then exhausted to the outside of the building.

In some embodiments, water is supplied to and wets the surfaces of the wet channels of a stand-alone unit by means of a pump with sprayer nozzle. In other embodiments, the wet channels are placed in a water filled sump, and the wet channels are wetted by means of capillary forces. In some embodiments, un-evaporated and run-off water is collected in a sump below the wet channels. In some embodiments, water from the sump is then recirculated to the spray nozzles. In some embodiments, make-up water is supplied to the sump using the building plumbing system, rainwater collection, or other means. In some embodiments, flow valves are used to control water flow.

2. Stand Alone Unit

In some embodiments, the IEC is a stand-alone, roof-top, or wall-pack unit. In some embodiments, the stand-alone evaporative cooling system cools an interior space. In some embodiments, the stand-alone evaporative cooling system cools an exterior space. In these embodiments, these stand-alone IEC systems can include the following components. A blower fan at the exterior of the unit's housing supplies working air from the outside of the building. This air is then supplied to a heat exchange media. The heat exchange media can be in parallel, crossflow, counterflow, regenerative, dew-point, M-cycle or other configurations. In some embodiments, the heat exchange media is wetted by means of pump with sprayer novel, wicking, or by drenching. In some embodiments, un-evaporated and run-off water is collected by a sump, and in the case of sprayer systems with pumps, recirculated. In some embodiments, flow valves are used to control water flow. In some embodiments, the cooled product air is directed into the building via a series of ducts while the wet working air is exhausted to the outside of the building. In some embodiments, flow valves are used to control outlet air flow and/or to mix untreated outdoor air with treated product air.

I. Inhibition of Vapor Flow

A. Mechanism of Directionality and Selectivity

Water vapor travels from areas of high water content (i.e., water vapor pressure, or partial pressure of water vapor) to areas of low water content. In some embodiments, for efficient evaporative cooling, the wet channels can be isolated from the dry channels by the means of a barrier layer.

In some embodiments, vapor flow can be inhibited by several physical mechanisms, and combinations thereof. In some embodiments, reducing of the number of pores or the size of the pores can inhibit vapor flow. In other embodiments, the tortuosity of the path available for vapor transport can inhibit vapor flow. In some embodiments, a plurality of pores in a ceramic body can be completely blocked or partially constricted by backfilling with a sol-gel, colloidal nanoparticles, or other material. In this embodiment, the mass transport can be limited by selective Knudsen diffusion, molecular (i.e. Fickian) diffusion, surface diffusion, capillary condensation, or combinations thereof, depending on the size of the pores present in the barrier layer, the molecular interactions between the vapor/liquid and solid, and operating conditions (e.g., pressure). In some embodiments, transport through a ceramic body can be further inhibited by reducing of the pore surface energy by replacing hydrophilic functional groups (e.g., hydroxyl groups) with hydrophobic functional groups via chemical modification, creating a high interfacial energy barrier for water to spread throughout the solid. In some embodiments, the combination of a low surface energy or hydrophobic chemical modification (e.g., fluoroalkyl-functionalization) and a nano-scale or microscale morphology (e.g., boehmite or nanoparticles) can yield superhydrophobic behavior beyond that of hydrophobic chemical modification alone. In this embodiment, the increased superhydrophobic behavior increases the capillary pressure required for wetting any pores present in the ceramic barrier coating, therefore further limiting the penetration of moisture from a wet channel in an IEC to a dry channel.

B. Configuration of Channels in Evaporative Cooling Systems

In some embodiments, indirect evaporative cooling heat exchange media can be described as a series of surfaces, plates, channels, tubes, or other geometries that have a layer of porous, wickable, or other fluid retaining material and a layer of waterproof or low permeance material. In some embodiments, the exchange media's configuration and composition are used to promote heat transfer while also inhibiting mass transfer.

The term water vapor can include any liquid or fluid flow including air, water, water vapor, and particulate matter (organic, inorganic, inert, etc.) within these flows. A wet channel or surface refers to any heat exchange media or configuration that has a flow of air or fluid across, through, or around it with water vapor on, in, or flowing within a porous media. A dry channel or surface refers to any heat exchange media or configuration that has a flow of air or fluid across, through, or around it but impedes the flow or diffusion of water vapor from a region of high pressure, temperature, or concentration. In some embodiments, a dry channel is configured to inhibit transfer of water vapor into the dry channel. In some embodiments, dry channels include a barrier layer that includes a roughened layer and a hydrophobic chemical modification. In some embodiments, the heat exchange media is a porous ceramic.

In some embodiments, an evaporative cooling system has one of the following configurations: parallel-flow, counter-flow, or cross-flow. In some embodiments, the evaporative cooling systems are indirect evaporative cooling systems (IEC), Regenerative Indirect Evaporative Cooling Systems (R-IEC), Dew-Point Indirect Evaporative Cooling Systems (D-IEC), or Maisotsenko Indirect Evaporative Cooling Systems (M-IEC).

In some embodiments, parallel-flow evaporative cooling configurations include heat exchange media wherein the flow of air or other fluids in the dry and wet channels is parallel, and in the same direction. In some embodiments, parallel flow configurations can be used for direct evaporative cooling. In these embodiments, the direct evaporative cooling system includes wet channels arranged in a parallel configuration. In other embodiments, parallel flow configurations can be used for indirect evaporative cooling. In these embodiments, the indirect evaporative cooling system includes wet and dry channels.

In some embodiments, counter-flow configurations describe heat exchange media wherein the flow of dry product air in a dry channel is in the opposite or counterflow direction compared to the wet working air in a wet channels. In these embodiments, the channels are parallel, but flow is in opposite directions.

In some embodiments, cross-flow configurations describe heat exchange media wherein the flow of dry air in the dry channels is perpendicular to the flow of wet air in wet channel.

FIGS. 2A-2B show an embodiment of a direct evaporative cooling system 200 in a parallel configuration. As shown in FIG. 2A, in this embodiment, the direct evaporative cooling system includes one or more wet heat exchange channels 201 flowing air 203 in contact with water. In this embodiment, the water evaporates and diffuses into the flowing air 203 in the wet channel 201. In this embodiment, the flowing air serves both as working air and product air. As shown in FIG. 2B, the temperature of the air 203 decreases while the humidity ratio increases.

In some embodiments, indirect Evaporative Cooling Systems (IEC) include one or more wet heat exchange channels (or surfaces) flowing a secondary (or working) air in contact with water and one or more dry heat exchange channels (or surfaces) with a primary (or product) air that is being sensibly cooled. Heat from the primary, product air transferred through the heat exchange media to the wet channels is absorbed by the water as latent heat, and the water is evaporated and diffused into the secondary wet air. In some embodiments, the primary product air and secondary working air can flow from separate inlets to separate outlets in parallel, counterflow, or crossflow configurations. In these embodiments, the warm product air in the dry channels transfers heat through the heat exchange media to the wet channels. The dry bulb temperature of the primary product air can be reduced to the lower limit of the wet-bulb temperature of the secondary working air at the inlet. The moisture content of the primary product air remains constant while the moisture content of the secondary working air increases and can reach saturation state (dew point). One benefit of IEC is that the primary product air is cooled without increasing the moisture content. However, the primary air dry bulb temperature is limited by the wet-bulb temperature of the secondary working air.

Figures 3C, 3D:
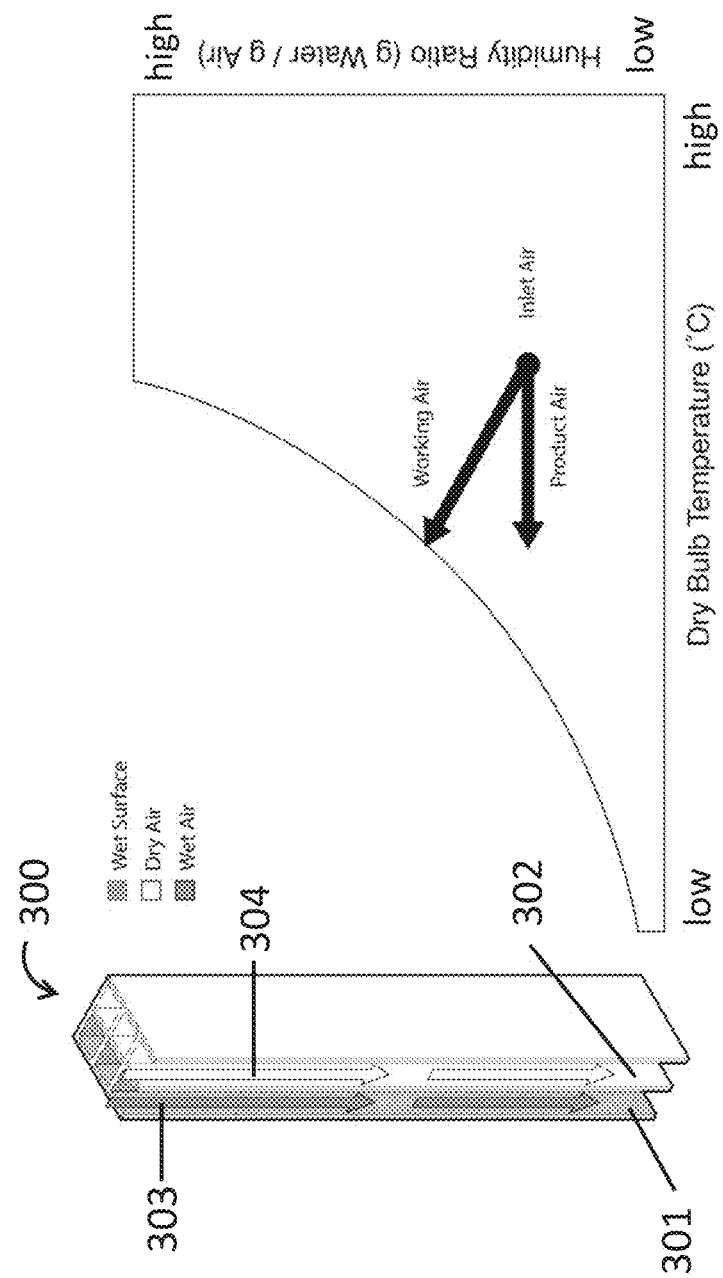
FIG. 3C illustrates a parallel indirect cooling configuration, in accordance with certain embodiments.
FIG. 3D illustrates the resulting theoretical psychrometric cooling of a parallel indirect cooling configuration, in accordance with certain embodiments.
Figures 4A, 4B:
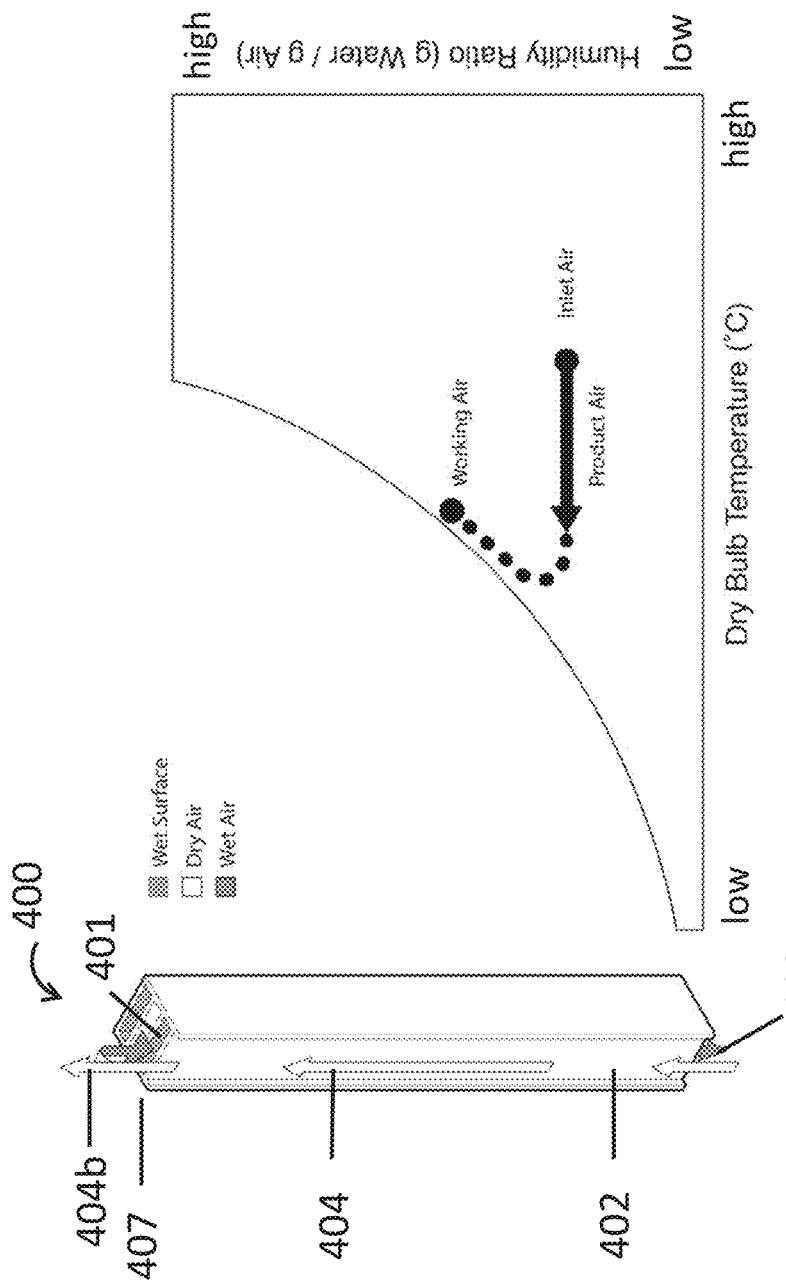
FIG. 4A illustrates an indirect regenerative evaporative cooling configuration, in accordance with certain embodiments.
FIG. 4B illustrates the resulting theoretical psychrometric cooling of an indirect regenerative evaporative cooling configuration, in accordance with certain embodiments.

FIGS. 3A-3B show an embodiment of an indirect evaporative cooling system 300 in a parallel configuration. As shown in FIG. 3A, in this embodiment, the indirect evaporative cooling system 300 includes wet channels 301 arranged in a parallel configuration. In these embodiments, the wet working air 303 flows through the wet channel 301 and the dry product air 304 flows across the outside surface of the wet channel 301 in the same, parallel direction. In some embodiments, the outside surface includes a barrier layer. FIG. 3B shows the theoretical psychrometric cooling of a parallel-flow indirect evaporative cooling system. As shown in FIG. 3B, the temperature of the wet working air decreases while the humidity ratio of the wet working air increases and the temperature of the dry product air decreases while the humidity ratio of the dry product air stays constant FIGS. 3C-3D show another embodiment of an indirect evaporative cooling system 300 in a parallel configuration. As shown in FIG. 3C, in this embodiment, the indirect evaporative cooling system 300 includes wet channels 301 and dry channels 302 arranged in a parallel configuration. In these embodiments, the wet working air 303 flows through the wet channel 301 and the dry product air 304 flows through the wet dry channel 302 in the same, parallel direction. In some embodiments, the dry channels include a barrier layer. FIG. 3D shows the theoretical psychrometric cooling of a parallel-flow indirect evaporative cooling system. As shown in FIG. 3D, the temperature of the wet working air decreases while the humidity ratio of the wet working air increases and the temperature of the dry product air decreases while the humidity ratio of the dry product air stays constant In some embodiments, shown in FIGS. 4A-4B Regenerative Indirect Evaporative Cooling Systems (R-IEC) in parallel, counterflow, or crossflow configurations one or more wet heat exchange channels 401 (or surfaces) flowing a secondary (or working) air 403 in contact with water and one or more dry heat exchange channels 402 (or surfaces) with a primary (or product) air 404 that is being sensibly cooled. FIGS. 4A-4B show a regenerative indirect evaporative cooling system in a counterflow configuration. In some embodiments, shown in FIG. 4A, regenerative indirect evaporative cooling systems include adjacent wet channels 401 and dry channels 402 with working air 403 and 404 flowing in opposite directions. Heat from the primary product air 404 in the dry channels 402 transferred through the heat exchange media to the wet channels 401 is absorbed by the water as latent heat. The water evaporates and diffuses into the secondary working air 403 in the wet channel 401. In some embodiments, a portion of the primary product air flow is extracted at the primary product airflow outlet 407 and used as the inlet air flow for the secondary working air flow in counterflow or crossflow configurations. In this embodiment, the remaining portion of the product air 404b enters the space to be cooled. In some embodiments, the dry channels include a barrier layer. Since the separated secondary working air has already been partially cooled, the working air has a lower wet-bulb temperature than the original inlet air flow. Therefore, the primary air can be cooled to a lower dry-bulb temperature, below the wet-bulb temperature of the primary air flow at the inlet. As shown in FIG. 4B, the moisture content of the primary air remains constant as it is cooled while the moisture content of primary product air that is recirculated, indicated by the dotted line, increases and can reach saturation state of the primary air outlet (dew point). One benefit of R-IEC is that the primary product air 404 is cooled below wet-bulb temperature without increasing its moisture content. However, R-IECs are associated with pressure loss and reduced flow rate.

Figures 5A, 5B:
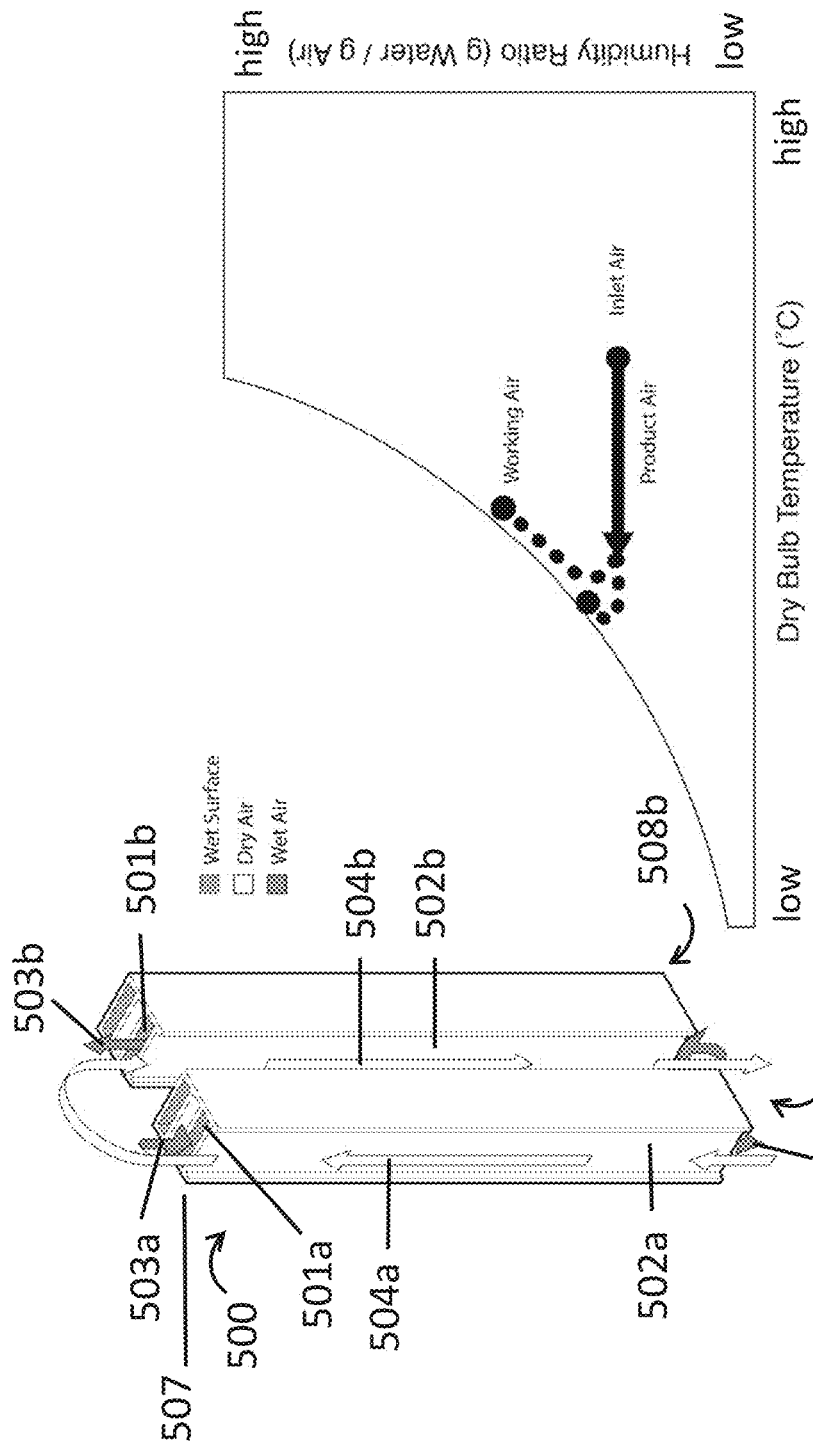
FIG. 5A illustrates a dew-point indirect regenerative evaporative cooling configuration, in accordance with certain embodiments.
FIG. 5B illustrates the resulting theoretical psychrometric cooling of a dew-point indirect regenerative evaporative cooling configuration, in accordance with certain embodiments.

In some embodiments, shown in FIGS. 5A-5B, Dew-Point Indirect Evaporative Cooling Systems (D-IEC) include multiple stages of R-IEC heat exchangers. In some embodiments, a D-IEC 500 includes multiple stages of dry channels 502a, 502b adjacent to multiple stages of wet channels 501a, 501b. In in some embodiments, the primary air 504a flows through the dry channel 502a of the first stage 508a. In this embodiment, a portion of the primary product air 504a flow of the first stage 508a of the R-IEC is extracted at the primary airflow outlet 507 and used as the inlet product air 504b flow for the dry channel 502b of the second stage 508b while the remaining primary airflow from the first stage 508a is used as the secondary wet air flow 503a in the wet channel 501a in counterflow or crossflow configurations for the first stage 508a. A portion of the primary air 504b flowing through the dry channel 502b of the second stage 508b is used as the secondary wet air flow 503b in the wet channel 501b in counter flow or crossflow configurations for the second stage 508b. This process can be repeated for multiple stages, for example, up to 20 stages. In some embodiments, the dry channels 502a, 502b, include a barrier layer. Since first stage primary air and second stage secondary air have already been cooled, both have a lower wet-bulb temperature than the original inlet air flow. Therefore, the primary air in first stage can be cooled to a lower dry-bulb temperature, below the wet-bulb temperature while the primary air in the second stage can be cooled near dewpoint. The moisture content of the primary air remains constant while the moisture content of the secondary air increases and can reach saturation state of the primary air outlet (dew point). One benefit of D-IEC is that the primary product air is cooled near or at dew-point temperature without increasing the moisture content. However, as the number of stages increases, the pressure and flow rate decrease.

In some embodiments, shown in FIGS. 6A-6D, Maisotsenko Indirect Evaporative Cooling Systems (M-IEC) include one or more wet heat exchange channels 601 (or surfaces) flowing a secondary working air 603a in contact with water, one or more dry heat exchange channels 602a (or surfaces) with a dry working air 603b that is being sensibly cooled, and one or more dry heat exchange channels 602b (or surfaces) with primary product air 604 that is being sensibly cooled. Heat from the dry working 603b and primary product air 604 is transferred through the heat exchange media to the wet channels 601 and absorbed by the water as latent heat. The water evaporates and diffuses into the secondary wet working air 603a. In some embodiments, the dry channels include a barrier layer.

FIGS. 6A-6B show an embodiment of a Maisotenko-like Indirect Evaporative Cooling system 600 in a counterflow configuration. In this embodiment, shown in FIG. 6A, the dry working air 603b and primary product air 604 flow through dry channels 602a, 602b, in a direction opposite the wet working air 603b in the wet channels 601. In this embodiment, air flows from multiple inlets to (1) a dedicated dry channel 602a with multiple outlet passages forming inlets 606 to the wet channel 601 and (2) primary air dry channels 602b with outlets 607 to the conditioned space. Since the air entering the wet channel 601 from the dedicated dry channel inlets 606 has already been cooled, this air has a lower wet-bulb temperature than the original inlet air flow. Therefore, the dry working air 603b in the primary dry channels 602a can be cooled to a lower dry-bulb temperature, below the wet-bulb temperature of the primary air flow at the inlet, near dew point. In some embodiments, shown in FIG. 6B, the moisture content of the primary product air 604 remains constant while the moisture content of the wet working air 603a isothermally increases at each inlet 606 from the dedicated dry working air 603b. One benefit of M-IEC is that the primary product air 604 is cooled near dew-point temperature without increasing the moisture content. However, the flow structure involves a more complex channel design of the ceramic element.

FIGS. 6C-6D shows an embodiment of a Maisotenko-like Indirect Evaporative Cooling system 600 in a crossflow configuration. In this embodiment, shown in FIG. 6C, the dry working air 603b and primary product air 604 flow through dry channels 602a, 602b, in a direction perpendicular to the wet working air 603a in the wet channels 601. In this embodiment, air flows from multiple inlets to (1) a dedicated dry channel 602a with multiple outlet passages forming inlets 606 to the wet channel 601 and (2) primary air dry channels 602b with outlets 607 to the conditioned space. Since the air entering the wet channel 601 from the dedicated dry channel inlets 606 has already been cooled, this air has a lower wet-bulb temperature than the original inlet air flow. Therefore, the dry working air 603b in the primary dry channels 602a can be cooled to a lower dry-bulb temperature, below the wet-bulb temperature of the primary air flow at the inlet, near dew point. In some embodiments, shown in FIG. 6D, the moisture content of the primary product air 604 remains constant while the moisture content of the wet working air 603a isothermally increases at each inlet 606 from the dedicated dry working air 603b. One benefit of M-IEC is that the primary product air 604 is cooled near dew-point temperature without increasing the moisture content. However, the flow structure involves a more complex channel design of the ceramic element.

III. Superhydrophobic Roughened Ceramic Heat Exchange Media

Figures 7A, 7B:
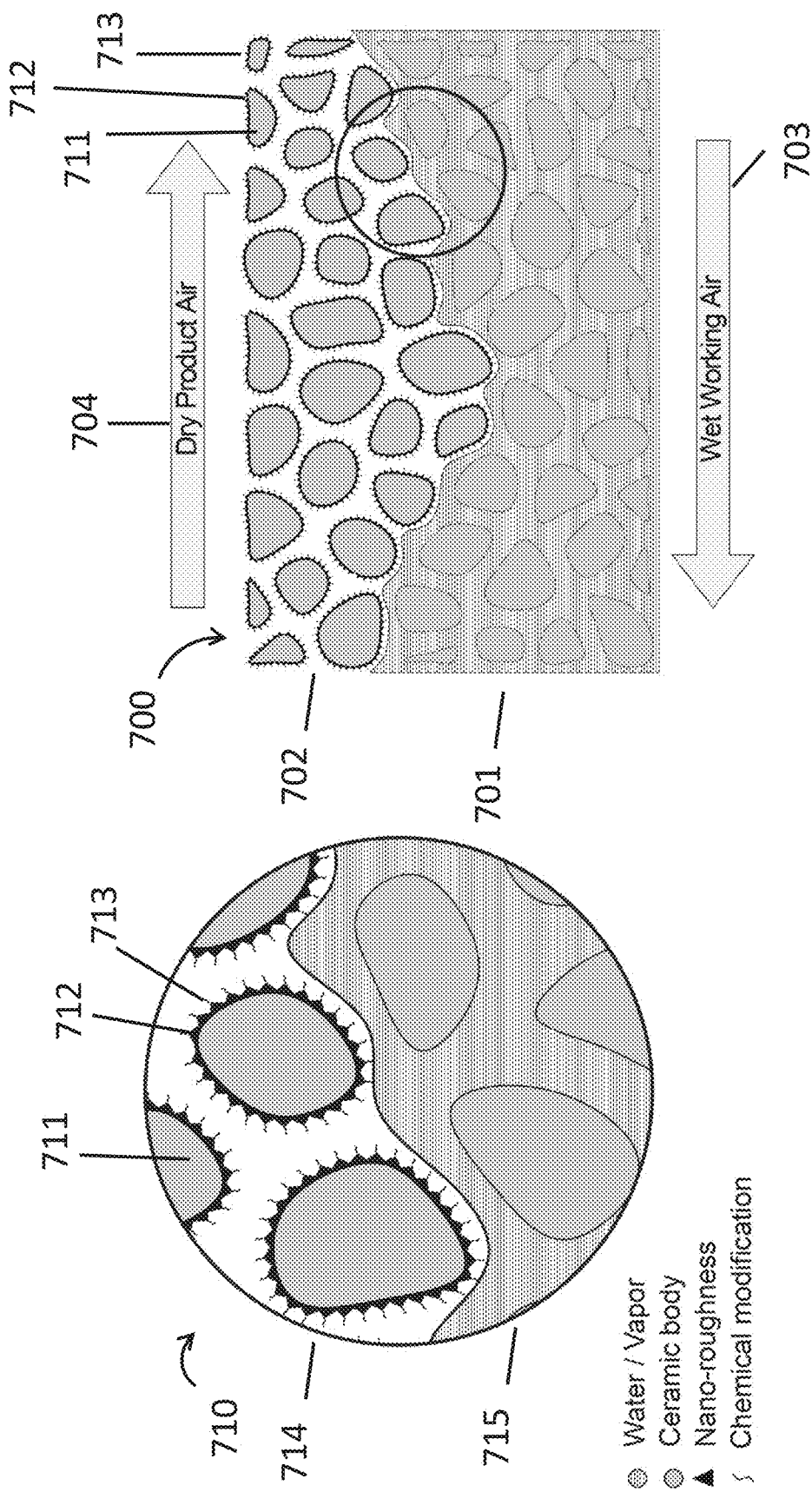
FIG. 7A illustrates a porous ceramic body with chemical modification and a roughened layer introduced via sol-gel impregnation of the ceramic body, in accordance with certain embodiments.
FIG. 7B illustrates transport of wet working air in untreated regions of a porous ceramic body and transport of dry product air in regions of a porous ceramic body with chemical modification and roughened layer, in accordance with certain embodiments.

In one aspect, shown in FIGS. 7A-7B, an evaporative cooling system includes a superhydrophobic roughened ceramic 710 within the dry channels of the evaporative cooling system. In some embodiments, a superhydrophobic roughened ceramic includes (i) a bulk porous ceramic body 711 with (ii) a roughened layer 712 and (iii) a hydrophobic chemical modification 713. The combination of (ii) and (iii) can be referred to as a "superhydrophobic coating" or barrier layer 714. In certain embodiments, the roughened layer 712 can have a feature size that is less than 1000 nm. In other embodiments, the roughened layer 112 can have a feature size that is less than 500 nm, 100 nm, 50 nm, 10 nm, 1 nm, 0.1 nm, and the like.

In some embodiments, a superhydrophobic roughened ceramic is incorporated into an evaporative cooling system 700 that includes a water reservoir and a pump. In some embodiments, the porous ceramic is the heat exchange media. In these embodiments, superhydrophobic coating or barrier layer selectively applied to a porous ceramic material such that the ceramic includes a treated superhydrophobic region or barrier layer 714 and an untreated region 715. As shown in FIG. 7B, this coating can be selectively applied in a configuration that allows flow of wet working air 703 across the untreated region 715 of the porous ceramic body to induce evaporative cooling of the ceramic body while the treated superhydrophobic portion 714 of the porous ceramic body remains dry, thus cooling a separate dry product air stream 704 without increasing its humidity. In some embodiments, the treated regions 714 are dry channels 702, while the untreated regions 715 are wet channels 701.

In some embodiments, selective application of the superhydrophobic coating forms an evaporative cooling system that includes multiple dry and wet channels in cross, counter, parallel, and other heat exchange flow configurations. In some embodiments, these channels can be arranged in parallel, counterflow, or crossflow configurations. In some embodiments, these channels can be arranged to form indirect evaporative cooling systems (IEC), Regenerative Indirect Evaporative Cooling Systems (R-IEC), Dew-Point Indirect Evaporative Cooling Systems (D-IEC), and Maisotsenko Indirect Evaporative Cooling Systems (M-IEC).

A. Porous Ceramics

In some embodiments, indirect evaporative cooling uses a porous medium to enable heat and mass transfer between the water present in the porous medium and the passing air, or between dry product air and wet working air. Several types of porous materials can serve as heat and mass transfer media in indirect evaporative cooling systems, namely metals, fibrous cellulose or polymeric pads, and ceramics. In some embodiments, porous ceramics 711 offer moderately high thermal conductivity/conductance, water-retaining capacity, wickability, shape customization, ease of fabrication, and low cost which make porous ceramics 711 suitable for use as evaporative cooling heat exchange media. In some embodiments, ceramics offer durability against wear, corrosion, and weathering. In some embodiments, the ceramics are oxides, composite ceramics or a combination of thereof. Non-limiting examples of oxides include alumina, silica, titania, beryllia, ceria, zirconia, manganese oxide, iron oxide, and combinations thereof. Additional non-limiting examples of oxides include clay bodies, stoneware, earthenware, porcelain, bone china, and combinations thereof. Non-limiting examples of composite ceramics include particulate-reinforced composites, fiber-reinforced composites, and combinations of oxides and non-oxides.

In some embodiments, porous ceramics are thermally conductive. In some embodiments, the thermal conductivity of porous ceramics is related to composition, porosity, and manufacturing process. The composition of the porous ceramic includes purity, grain size and density. The porosity includes pore size and distribution. For example, the thermal conductivity of a ceramic will decrease with increased porosity and with decreased grain size. In some embodiments, the thermal conductivities of ceramics generally fall between those of metals and organic fibrous materials, synthetic fibrous materials, ranging from 0.1 to 240 W/m·K, making ceramics desirable for heat and mass transfer in air conditioning applications.

Ceramics can be used to make various building components, such as walls, roofing, and flooring because of their long lifespan and characteristic light weight. Moreover, ceramics can be shaped using various fabrication methods. In some embodiments, ceramics have Young's moduli ranging from 50 to 1000 GPa. The shape-retention of ceramics, due to their superior hardness, makes them suitable for use as heat exchanger media. In some embodiments, when ceramics are used as building cladding, ceramics are self-supporting and can withstand high wind loads and weather-related impacts, such as hail. Furthermore, porous ceramics are durable in wet conditions and are not prone to corrosion.

In some embodiments, a porous ceramic includes a barrier layer or hydrophobic coating on one side of a heat exchanging element to allow indirect evaporative cooling of product air without adding moisture. In these embodiments, compatible waterproof coatings can be selected to maintain high durability and sustained performance. In some embodiments, the porous ceramic and waterproof coating have interfacial adhesion at high moisture levels and matching thermal expansion coefficients to eliminate mechanical deformation or delamination.

The ability for ceramics to absorb or adsorb fluid is related to the surface free energy, pore radius, pore geometry, isolation or connectivity of pores (tortuosity), pore surface roughness and charge, and the bulk porosity of the ceramic media (total volume of void space). Fluid absorption can occur in three domains: (1) hygroscopic fluid absorbed as a vapor phase; (2) capillary fluid absorbed as a liquid phase by capillary forces; and (3) gravitational fluid absorbed as a liquid phase by gravity or super-saturation. In some embodiments, fluids are adsorbed by van der Waals forces between the fluid and the pore walls. In some embodiments, the mass transport is diffusion-limited. Generally, fluid retaining capacity increases with increasing pore radius and bulk porosity. Sensible heat transfer can be enhanced by lower fluid retaining capacity and low porosity. In some embodiments, the porous ceramics have pore sizes between 0.1 and 1 nm, 1 and 10 nm, 10 nm and 100 nm, 100 nm and 1000 nm, between 1 µm and 10 µm, 10 and 100 µm, 100 µm and 1000 µm, or between 1 mm and 10 mm. In some embodiments, porous ceramics have a total pore volume from 1 to 10, 10 to 20, 20 to 30, 30 to 40, 40 to 50, 50 to 60, 60 to 70, or 70 to 80 percent.

In some embodiments, porous ceramics can be formed using various methods including, but not limited to, extrusion, co-extrusion, casting, foams, additive manufacturing, and multi-material manufacturing.

In some embodiments, porous ceramics can be formed by extrusion. Extrusion can include forcing a clay body through a die to create an object with a fixed or variable cross-sectional profile. In some embodiments, porous ceramics are formed by co-extrusion. Co-extrusion is similar to extrusion but involves multiple clay bodies with varying properties extruded together simultaneously.

In some embodiments, porous ceramics are formed by pressing. Pressing includes pressing dry ceramic powder in a mold using high pressure. In some embodiments, porous ceramics are formed by casting. In some embodiments, casting includes slip casting and pressure casting where slip, or liquid clay is poured or injected into a plaster mold. Water in the slip can be drawn out by the porous plaster mold, resulting in a solid clay body. In some embodiments, porous ceramics are formed using foams. Non-limiting examples of methods for foaming ceramic include polymeric sponge method, pumping of air into suspended ceramics, and formation of gas from a chemical reaction in suspended ceramics.

In some embodiments, porous ceramics are formed by additive manufacturing. Non-limiting examples of methods for ceramic additive manufacturing include hardening ceramic powder with a polymer binding agent using stereolithography, hardening ceramic powder using binder jetting, and extrusion of paste-based ceramics. In some embodiments, porous ceramics are formed by multi-material additive manufacturing. Non-limiting examples of methods for multi-material additive manufacturing include extrusion of paste-based ceramics with multiple clay bodies with varying properties using multiple extrusion heads or mixing of clay bodies within an extrusion head.

B. Roughened Layer

In some embodiments, shown in FIG. 7A, a portion the porous ceramic 711 is coated with a roughened layer 712. In certain embodiments, the roughened layer 712 can have a feature size that is less than 1000 nm. In other embodiments, the roughened layer 712 can have a feature size that is less than 500 nm, 100 nm, 50 nm, 10 nm, 1 nm, 0.1 nm, and the like. In some embodiments, the roughened layer includes a rationally controlled nanoscale or microscale porous or rough surface. In some embodiments, the roughened layer has nanoscale roughness or porosity. In some embodiments, at least one dimension of the features of the roughened layer is less than 1000 nm.

In some embodiments, the roughened layer is a metal oxide layer disposed on the surface of a portion of porous ceramic body 711 or penetrating into the bulk of a portion of the porous ceramic body 711. Non-limiting examples of metal oxides include alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide and combinations thereof. In some embodiments, the roughened layer is aluminum oxyhydroxide or boehmite.

In some embodiments, the feature size of the roughened layer is between 0.1 to 1 nm, 1 nm and 10 nm, 10 nm and 50 nm, 50 and 100 nm, 100 nm and 500 nm, 500 and 1000 nm, 1 µm and 20 µm, or combinations thereof.

In some embodiments, the roughness of the roughened layer is between 0.1 to 1 nm, 1 nm and 10 nm, 10 nm and 50 nm, 50 and 100 nm, 100 nm and 500 nm, 500 and 1000 nm, 1 µm and 20 µm, or combinations thereof. In some embodiments, roughness can be introduced by a sol-gel process, application of nanoparticles, sandblasting, chemical etching, electrochemical etching, plasma etching, laser etching, re-crystallization, hydrothermal treatment, sacrificial pore-generating additives (including solid, liquid, or gas phase), layered deposition, spray coating or combinations thereof. In some embodiments, surface roughness is based on porosity, microstructures, nanostructures, or combinations thereof.

In some embodiments, variations in chemistry, material composition, deposition conditions, and post-processing treatments can result in metal-oxide roughened layers with a range of roughness or porosity length scales. In some embodiments, the pore length scale of the roughened layer can be a sub-nanometer length scale inherent to the molecular network, forming a diffusion-limited vapor barrier. In other embodiments, the pore length scale can be up to a millimeter-scale by use of sacrificial porogens, such as polymer beads or organic matter that can be pyrolyzed away to create voids of an intended size in the nano-structured layer. In some embodiments, the porosity of the roughened layer can have a length scale from sub-nanometer to millimeter length. In some embodiments, the porosity of the roughened layer can be used to tune the vapor permeance. For example, smaller pores can reduce vapor permeance. In certain embodiments, moderate levels of vapor permeance can be beneficial to the comfort of the building occupants or system energy efficiency.

In some embodiments, variations in chemistry, material composition, deposition conditions, and post-processing treatments can result in metal-oxide roughened coatings with a range of thicknesses, including penetration depth into the bulk porous ceramic. Non-limiting examples of deposition conditions include infusion time, withdrawal rate, and dipping rate. In some embodiments, the thickness of the roughened layer is from 10 nm to 100 nm, 100 nm to 1 μm, 1 μm to 10 μm, 10 to 100 μm, or 100 μm to 1000 μm. In some embodiments, a thin metal oxide roughened layer can promote heat conductance and offer a visibly transparent coating for exterior structures.

Depending on formulation, the roughened layer can be introduced to the ceramic or clay body at various stages, including raw clay (dry or wet), slip, plastic, leather-hard, bone-dry, bisque, and fired.

In some embodiments, the roughened layer can be spatially patterned onto the porous ceramic. Non-limiting examples of spatially patterning include masking or Computer Numerical Control (CNC) automated or programmed deposition via 3D-printing or spraying. In some embodiments, selective patterning can be achieved within the bulk of a porous ceramic body. Non-limiting methods for selective patterning within a porous ceramic body include extrusion, co-extrusion, pressing, co-injection, casting, foams, additive manufacturing, or multi-material additive manufacturing. In some embodiments, patterning can create areas or channels of high and low vapor permeance with dimensions from millimeter to meter scale within a single porous ceramic body. Selective patterning can reduce the cost and complexity of fabricating evaporative cooling devices. In some embodiments, existing ceramic elements can be repurposed or retrofitted as indirect evaporative coolers.

In some embodiments a porous ceramic body can be formed by co-extrusion using multiple extrusion nozzles, heads, or similar end-effectors to extrude multiple clay bodies with varying clay formulations within a continuous three-dimensional porous ceramic body. In this embodiment, a first extrusion head is used to deposit a clay formulation, while a second extrusion head is used to deposit a formulation of clay and roughened layer components (e.g., sol-gel precursors or particles). In this embodiment, the material deposited by the first extrusion head is untreated porous ceramic, while the material deposited by the second nozzle is porous ceramic with a roughened layer. In some embodiments, the extrusion head with untreated porous ceramic can be used to form wet channels and the extrusion head with porous ceramic and roughened layer components can be used to form dry channels.

In some embodiments, co-extrusion can be accomplished with a single extrusion head. In these embodiments, the composition of the material extruded by the extrusion head changes over time. For example, the co-extrusion instrument can include a mixer. In these embodiments, the roughened layer components can be added to the mixer in different amounts and at different times. In some embodiments, extrusion of a porous ceramic with temporally varying composition can result in a porous ceramic body with spatial patterning. For example, wet channels can be formed while the extrusion head deposits untreated porous ceramic material, and dry channels can be formed while the extrusion deposits porous ceramic material with roughened layer components. In some embodiments, co-extrusion can be used to create a spatial gradient in the amount of roughened layer components in the porous ceramic body. For example, if the concentration of roughened layer components in the extruded ceramic material increases over time, the amount of roughened layer components in the porous ceramic body can increase from one point to another. In some embodiments, gradients in amount of roughened layer components can be used to create gradients in permeance in the porous ceramic body.

In some embodiments, shown in FIGS. 8A-8D, patterning can be used as architectural ornamentation that is only visible when the untreated regions 815 are wetted, providing an opportunity for signage, environmental indicators, moisture indicators, or other functional displays. In some embodiments, signage, environmental indicators, moisture indicators, or functional displays formed using selective patterning can be used to quickly verify performance of an evaporative cooling systems, for example, in remote areas of the evaporative cooling system. In some embodiments, signage, environmental indicators, moisture indicators, or functional displays indicate whether a plumbing system is supplying adequate water to the evaporative cooling system. In other embodiments, signage, environmental indicators, moisture indicators, or functional indicate to a user that the evaporative cooling system is operating. In other embodiments, spatial patterning can be used to selectively treat channels of evaporative cooling system with a barrier layer to form dry channels. In this embodiment, untreated channels of the evaporative cooling system form wet channels.

Figure 8B:
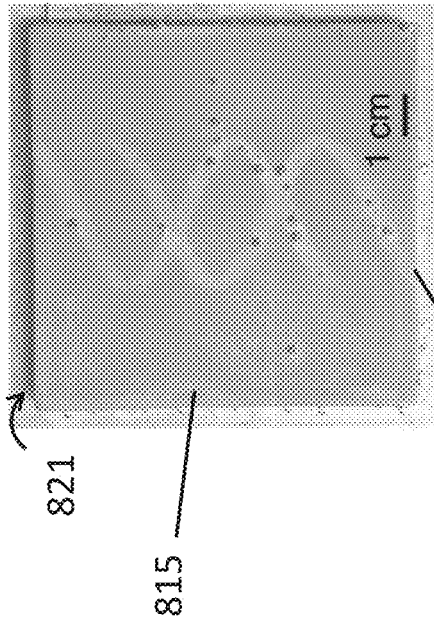
FIG. 8B illustrates a masking pattern, in accordance with certain embodiments.
Figure 8D:
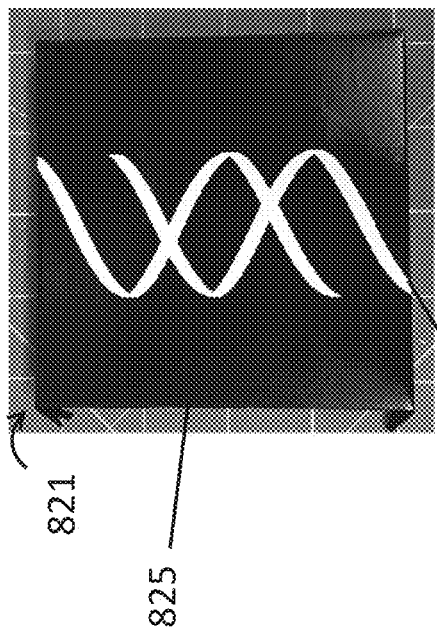
FIG. 8D illustrates a ceramic tile with a patterned sol-gel applied barrier layer immersed in water, in accordance with certain embodiments.
Figure 8A:
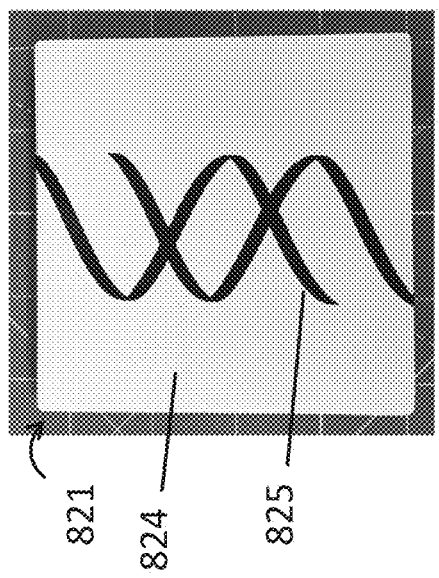
FIG. 8A illustrates a masking pattern, in accordance with certain embodiments.
Figure 8C:
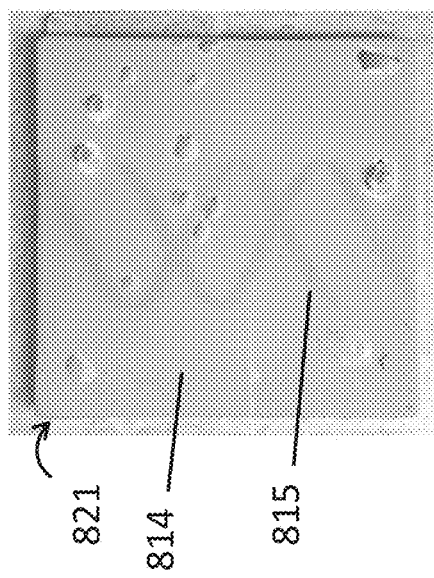
FIG. 8C illustrates a ceramic tile with a patterned sol-gel applied barrier layer immersed in water, in accordance with certain embodiments.

FIGS. 8A and 8B show masks 825 that can be used for spatial patterning of a bisque ceramic tile 821. The white regions 824 correspond to regions that will be exposed to deposition of the vapor barrier layer that includes a roughened layer and chemical modification, while the black regions 825 correspond to regions that will remain untreated 815. As shown in FIGS. 8C-8D, after spatial patterning, ceramic tiles 821 include treated regions 814 corresponding to the white unmasked regions 824, where tile was exposed to deposition of a sol-gel roughened layer and fluoro-functionalization, and untreated regions 815 corresponding to the black regions 825, where the tile was not exposed to deposition of the barrier layer. As shown, in FIGS. 8C-8D, when the tile is exposed to water vapor, the untreated regions 815 will be wetted and darkened. In contrast, the treated regions 814 will not be wetted because of their reduced permeance. In some embodiments, a visual pattern can be formed on the tile in this way. In other embodiments, wet and dry channels can be formed in an evaporative cooling system in this way.

In some embodiments, enhanced functionality can be added to the roughened layer via the incorporation of additives into the bulk coating formulation. Non-limiting examples of additives include biocidal/disinfectant components (e.g., silver nanoparticles or quaternary ammonium compounds), photo-catalytic and/or odor-reducing components (e.g., titania nanoparticles), and optical components (e.g., colorants/dyes and IR reflective particles). Non-limiting examples of IR reflective particles include nano- and micro-crystalline Titania (TiO2), Zinc Oxide (ZnO), Cerium Oxide (CeO$_2$), Magnesium Oxide (MgO), Aluminum Oxide (Al$_2$O$_3$).

In some embodiments, exterior ceramic heat-exchange elements reduce radiant heat gain flux. For example, the near infrared-red absorptivity of aluminum oxide is on the order of 0.40, while the near infrared-red absorptivity of earthenware ceramics is on the order of 0.80, representing nearly half of potential solar heat gain.

In some embodiments, when a roughened layer is applied to tiles, roof-tiles, pottery, and other materials, the ceramic roughened layer can increase product longevity and reduce potential degradation caused by wet environments.

1. Roughened Layer Formed by Sol-Gel Processing

In some embodiments, the roughened layer is formed by sol-gel processing. Sol-gel processing can produce high quality glasses and fine ceramics. In some embodiments, sol-gels form thin surface coatings. Sol-gel coatings offer several advantages, including low processing temperatures, cost effectiveness, and compatibility with diverse substrate materials and complex geometries. In some embodiments, a sol-gel film adheres strongly to porous oxide ceramic substrates due to the presence of hydroxide groups on the surface of a porous oxide ceramic.

In some embodiments, alkoxides of a metal can be used as the precursor materials in the sol-gel process. Non limiting examples of alkoxides include alkoxides of aluminum, titanium, silicon, copper, zirconium, cerium, barium, germanium, yttrium, strontium, hafnium, magnesium, niobium, tin, tantalum, tungsten, and combinations thereof. In some embodiments, precursor materials can be dissolved in an organic solvent. Non-limiting examples of organic solvents include isopropyl alcohol, ethanol, methanol, butanol, methoxyethanol, methoxyethoxyethanol, tert-Amyl alcohol, cyclohexane, and combinations thereof. In some embodiments, a hydrolysis reaction is initiated by addition of water to the precursor-solvent solution, leading to gel formation. In some embodiments, hydrolysis includes attachment of a hydroxyl ion to a metal atom, replacing an organic group. In some embodiments, hydrolyzed molecules can further undergo a condensation reaction, in which an oxygen link between two metals is formed. In some embodiments, progressive hydrolysis and condensation reactions continue to build larger polymers, which over time crosslink together in a continuous network gel.

In some embodiments, a semi-viscous gel can be applied at this point as a thin layer to a substrate using a variety of deposition methods. Non-limiting examples of deposition methods include spray coating, painting, spin coating, and dip coating. Upon deposition, the gel includes polymer and residual solvent. In some embodiments, solvent removal occurs through evaporation, for example, during the deposition process or during a thermal treatment. In some embodiments, after solvent removal, residual organic matter can be removed with continued heating or pyrolysis, resulting in a dense structure. In some embodiments, heating includes a low temperature hold in the range of 40° C. to 400° C. In other embodiments, heating includes slow heating to the sol-gel metal oxide crystallization temperature range of about 300-1600° C. In some embodiments, a continuous metal oxide sol-gel film forms directly from a homogeneous liquid. In this embodiment, the roughened layer has no inherent packing porosity or minimum thickness, limitations which can arise from a particle-based coating.

In some embodiments, capillary pressure will favor the flow of liquid into the pores of porous ceramics, such that coating solutions can readily infiltrate the porous ceramic body. Since some porosity within the ceramic structure is desirable for water-retention and evaporation, the penetration depth of the coating solution can be controlled to prevent a significant decrease in porosity of the porous ceramic caused by the roughened layer. The thickness of the roughened layer can refer either to the thickness of an overlayer on top of the porous ceramic surface or to a penetration depth within the porous ceramic body. Non-limiting examples of methods to control the thickness of the roughened layer include varying the solution viscosity and surface tension via chemical or physical additives (e.g., particulate sols), manipulating the surface energy of the porous ceramic, and temporarily blocking the pores with a volatile or sacrificial filler material before coating. In some embodiments, synthesis parameters, including but not limited to, water:solvent:precursor ratio, solution pH, aging time of the sol, particle size distribution, and grain size distribution can also be modified to vary the thickness of a roughened layer overlayer or penetration depth of a roughened layer into the porous ceramic. In some embodiments, processing and coating parameters, including but not limited to, number of coats, spray velocity, withdrawal or soaking time can also be modified to vary the thickness of a roughened layer overlayer or the depth of penetration depth of a roughened layer into the porous ceramic. In some embodiments, the conditions can be such that the roughened layer coating solution infiltrates and blocks pores to a certain substrate depth to decrease the permeance of water vapor. In some embodiments, the sol-gel formulation solvent type or increased solvent concentration is selected as a means of decreasing the overall viscosity and/or surface tension to promote infiltration into the porous ceramic. In this embodiment, enhanced infiltration creates a roughened layer with increased thickness. In other embodiments, the viscosity and/or surface tension can be increased via solvent type, concentration, additives, or thickeners (e.g., inorganic nano- or micro- particles) to inhibit infiltration into the bulk porous ceramic, thus limiting the overall thickness. In some embodiments, the sol-gel formulation is applied with spray-coating, in which the thickness can be increased with layered deposition. In some embodiments, thermal treatments can be used to densify the coating, thus decreasing the overall thickness. In some embodiments, solution pH can be altered to drive the precipitation of particulates in the sol-gel, increasing solution viscosity, and reducing penetration depth.

Figure 9:
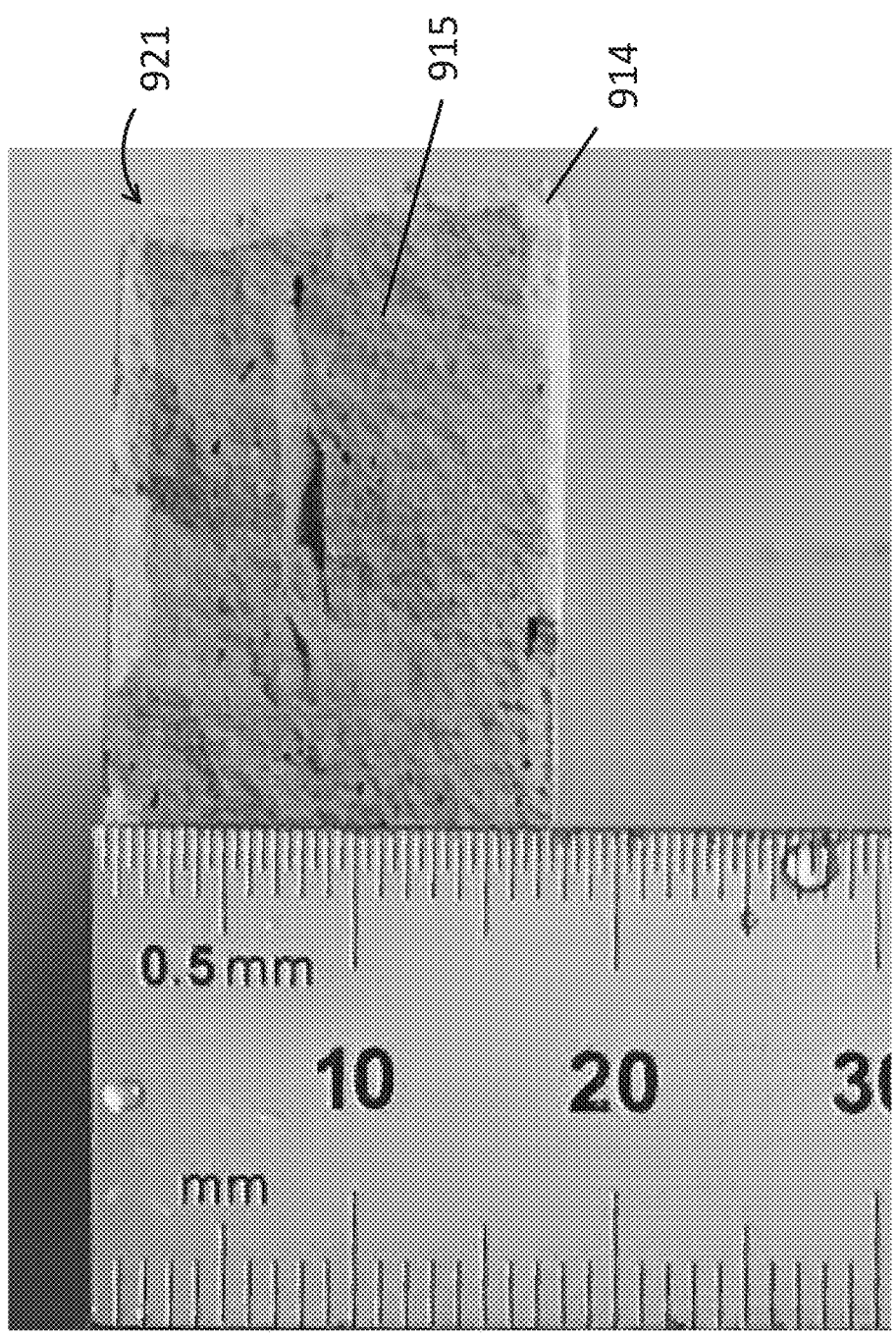
FIG. 9 illustrates a cross-section of a tile with a sol-gel treated region acting as a roughened layer with nanoscale roughness, in accordance with certain embodiments.

In one embodiment, shown in FIG. 9, penetration depth of a sol-gel roughened layer on a terracotta tile 921 can be tuned. In this embodiment, the sol-gel penetrates a few millimeters into the terracotta tile 921, and the sol-gel treated region 914 is visible as a lighter region. Beyond this penetration depth, the untreated region 915 is darker in color. In the embodiment shown in FIG. 9, penetration depth was controlled via the deposition process. In this embodiment, controlled volumes of the isopropanol-based sol-gel alumina solution was applied manually on all sides of the terracotta tile, thus limiting the amount of coating material available for infiltration.

In some embodiments, conditions can be tuned to produce a coating that exists as an overlayer, with no solution-wicking occurring within the pores of the ceramic body. In some embodiments, the sol-gel formulation solvent type or decreased solvent concentration is selected as a means of increasing the overall viscosity and/or surface tension to prevent infiltration into the porous ceramic. In some embodiments, the coating formulation is applied to a preheated porous ceramic, such that the carrier solvent vaporizes upon contact with the surface, thus limiting the infiltration into the porous ceramic. In some embodiments, the thickness of the overlayer is up to 500 µm. In some embodiments, the thickness of the overlayer is 100-200 nm, 200-500 nm, 500-1000 nm, 1-10 µm, 10-50 µm, 50-100 µm, 100-200 µm, 200-300 µm, 300-400 µm, or 400-500 µm. In these embodiments, bulk porosity and water-retention volume for the porous ceramic do not change. In this embodiment, only the pores on the exterior surface are closed, and the pores within the ceramic body remain open.

In other embodiments, the conditions can be such that the coating solution infiltrates and blocks pores at a certain substrate depth, decreasing the permeance of water vapor. In some embodiments, the thickness of sol-gel layer is correlated to the reduction in vapor permeance. In some embodiments, the penetration depth range is between 200 nm and 5 mm. In some embodiments, the penetration of the roughened layer is 200-500 nm, 500-1000 nm, 1-10 µm, 10-50 µm, 50-100 µm, 100-200 µm, 200-300 µm, 300-400 µm, 400-500 µm, 500-1000 µm, 1-2 mm, 2-3 mm, 3-4 mm, 4-5 mm.

In some embodiments, by varying the total solids content in the sol-gel solution the total porosity and tortuosity of the porous ceramic can be tuned to achieve moderate levels of vapor transmission. In one such embodiment, the coating solution is diluted by an organic solvent to reduce the effective metal oxide content, such that the volume of the metal oxide film formed is less than 10% of the original solution volume. In this embodiment, pores of the porous ceramic that were originally filled with the coating solution are now lined with a metal oxide film and the pore of the porous ceramic size is constricted. In some embodiments, the permeance of the coating can be further modified via the synthesis parameters to yield differing levels of porosity ranging from uniform, continuous dense films with low vapor transmission rates to highly disordered or cracked films with high transmission rates and any porosity in between. Non-limiting examples of synthesis parameters include water:solvent:precursor ratio, solids content, solution pH, aging time of the sol, particle size distribution, and grain size distribution.

In some embodiments, film densification resulting from increased gel network connectivity can be achieved via high temperature thermal treatment to produce denser films with further reduced vapor permeance. In some embodiments, the temperature of the high thermal treatment depends on sol-gel composition, phase transitions, and degree of densification. In some embodiments, a high temperature treatment occurs at temperatures from 300° C. to 1600° C. In certain embodiments, film densification can be achieved via a hydrothermal reaction, which simultaneously induces crystalline phase transformations and corresponding increase in surface morphology or roughness. In some embodiments, the hydrothermal reaction includes the conversion of aluminum oxide to aluminum oxyhydroxide or boehmite.

2. Roughened Layer Formed by Deposition of Nanoparticles

In some embodiments, shown in FIGS. 10A-10B, a super hydrophobic roughened ceramic 1010 with high thermal conductance vapor retarding barriers layers can be achieved on a porous ceramic body 1011 via a dispersion of metal oxide particles 1012. In some embodiments, the metal oxide particles can be further modified with a chemical modification 1013. In some embodiments, a super hydrophobic roughened ceramic 1010 with metal oxide particles 1012 is incorporated into an evaporative cooling system 1000. In these embodiments, the metal oxide particles 1012 are selectively applied to a porous ceramic material 1011 such that the ceramic includes a treated superhydrophobic region 1014 and an untreated region 1015. As shown in FIG. 10B, this coating can be selectively applied in a configuration that allows flow of wet working air 1003 across the untreated wetted porous ceramic matrix 1015 to induce evaporative cooling of the ceramic body while the treated superhydrophobic surface 1014 remains dry, thus cooling a separate dry product air stream 1004 without increasing its humidity. In some embodiments, the treated regions 1014 are dry channels 1002, while the untreated regions 1015 are wet channels 1001.

Non-limiting examples of metal oxides particles include alumina, silica, titania, cupric oxide, cuprous oxide, beryllia, ceria, zirconia, barium oxide, germanium oxide, yttria, strontium oxide, hafnium oxide, magnesium oxide, niobium oxide, tin oxide, tantalum oxide, tungsten oxide, and combinations thereof.

In some embodiments, metal-oxide particles can be applied to a porous ceramic by wash-coating, spray coating, dip coating, or painting, etc. In some embodiments, the metal oxide particles can be subsequently exposed to high temperatures ranging from 300 to 1600° C. to sinter the individual particles into a continuous film. In some embodiments, a sintering process can be integrated into the ceramic firing process. In other embodiments, sintering can be performed on previously fired ceramics.

In some embodiments, the initial dispersion of metal oxide particles can include a mixture of particles with varying chemical composition, a distribution of particle sizes, or a combination of varying composition and distribution of particle sizes. In some embodiments, the chemical composition varies based on elemental composition, crystalline phase, or both. In some embodiments, chemical composition and particle size can alter sintering temperature. In this embodiment a temperature treatment of a mixture of particles can sinter particles of certain types or sizes, while other particles are unaffected. In some embodiments, particle size can be tailored to limit or enhance penetration of the particles into the bulk of the porous ceramic. In some embodiments, penetration into the bulk affects the overall thickness, thermal conductance, and vapor permeance of the roughened layer. In some embodiments, heating and cooling conditions can be used to control recrystallization of the metal oxide particles, controlling the permeance of the metal oxide layers produced. In some embodiments, non-sintered particles can be used to introduce surface morphology or roughness (e.g., 2 nm-20 µm) onto the roughened layer. In other embodiments recrystallization parameters, including but not limited to emergent grain size, grain boundaries, or crystalline structures, can be used to introduce surface morphology or roughness (e.g., 2 nm-20 µm) onto the coating.

In some embodiments, the metal oxide particles have diameters between 2 nm and 10 nm, 10 nm and 50 nm, 50 nm and 100 nm, 100 nm, 500 nm, 500 and 1000 nm, 1 µm and 20 µm, and combinations thereof. In some embodiments, the metal oxide particles have at least on dimension between 2 nm and 10 nm, 10 nm and 50 nm, 50 nm and 100 nm, 100 nm and 500 nm, 500 and 1000 nm, and 1 µm and 20 µm.

In some embodiments, the metal particles have shapes including, but not limited to, spheres, rods, fibers, plates, cubes, and faceted structures. In some embodiments, particle shapes can be selected based on packing density to form a roughened layer with a particular porosity. In some embodiments, the particles are amorphous. In other embodiments, the particles are crystalline.

In one embodiment, metal-oxide particles can be added to a sol-gel formulation to form a composite roughened layer. In some embodiments, particles can be added as a dry phase, for example, as a powder with no carrier liquid. In other embodiments, particles can be added as a dispersion, for example, as a powder suspended in a carrier liquid, during the sol-gel processing. In some embodiments, particles can be added to the sol-gel precursor, to the solvent-diluted precursor, during hydrolysis, during condensation, or during gelation. In some embodiments, addition of metal oxide particles can reduce internal stresses in the gel during drying and densification processes. In some embodiments, the gel phase acts as a binder between the metal oxide particles. In some embodiments, composite roughened layers can achieve higher thickness and lower cracking probability by reducing the total volume contraction during drying and densification of the sol-gel material.

In some embodiments, the superhydrophobic vapor barrier system can be achieved through the addition of a 0-1%, 1-5%, 5-10%, 10-20%, 20-30%, or 30-40% weight dispersion of metal-oxide particles to a non-fired ceramic. In this embodiment, the intrinsic composition and morphology of the particles provides the necessary roughness and site for subsequent surface chemical modification. In some embodiments, the particles can be integrated prior to shaping of the ceramic body in the dry mix, slip, or plastic phases. In some embodiments, the particles are dispersed throughout the bulk of the porous ceramic body. In some embodiments, this method allows for selective patterning of particles within a continuous porous ceramic body through common manufacturing methods such as co-extrusions, pressing, co-injection, or multi-material additive manufacturing. Once shaped, the porous ceramic body with integrated particles can be fired without loss of nano- and micro-scale features. In some embodiments, the surface energy of the particles can be lowered after the ceramic is fired by functionalization with an alkane- or fluoroalkyl-terminated phosphate ester or other chemical modification to increase hydrophobicity. In some embodiments, the liquid or vapor application of the chemical modification selectively binds to the metal-oxide sites of the particles, leaving the surrounding bulk ceramic hydrophilic.

C. Hydrophobic Chemical Modification

In some embodiments, shown in FIG. 7A, roughened layer 712 disposed on the porous ceramic 711 can be further modified with a hydrophobic chemical modification 713. In some embodiments, the roughened layer 712 has a high surface energy and is hydrophilic. In these embodiments, a hydrophobic chemical modification 713 can be disposed on the roughened layer 712 to reduce its surface energy and form a low surface energy, superhydrophobic coating or barrier layer. In some embodiments, a superhydrophobic coating or barrier layer can be disposed on the walls of the dry channels.

Figure 11A:
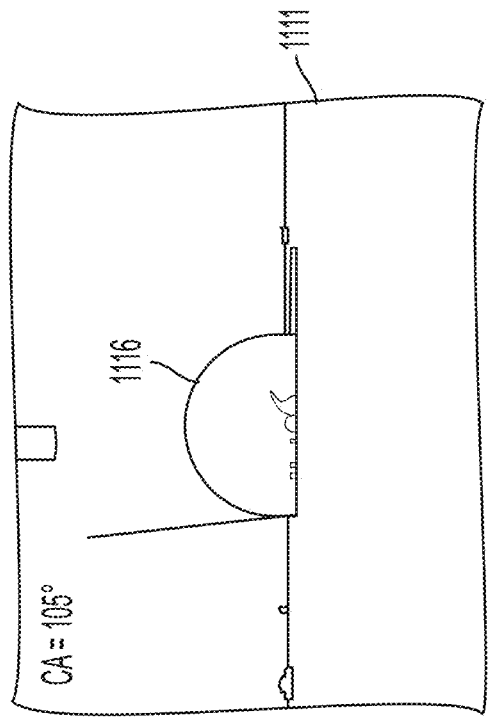
FIG. 11A illustrates the contact angle (CA) of water on untreated terracotta, in accordance with certain embodiments.

As shown in FIGS. 11A-11D, the surface energy of a porous ceramic body can be modified by addition of a roughened layer and chemical modification. In some embodiments, the surface free energy of metal oxides is very high due to the presences of polar hydroxyl groups. In some embodiments, polar hydroxyl groups can lead to dipole-dipole interactions or hydrogen bonding. As a result, metal oxides can be easily wetted by liquids and have a strong affinity for water present in the atmosphere. As shown in FIG. 11A, a terracotta substrate 1111 with a nano-scale roughened boehmite sol-gel coating is fully wetted by a water droplet 1116 and has a contact angle (CA) of 0° with the water droplet 1116. Metal oxides can be easily wetted because liquids are likely to spread on a surface to increase the contact area and minimize the total interfacial energy of the system. In some embodiments, for example within wet channels, a high surface energy can be beneficial for water permeance and retention.

Figure 11B:
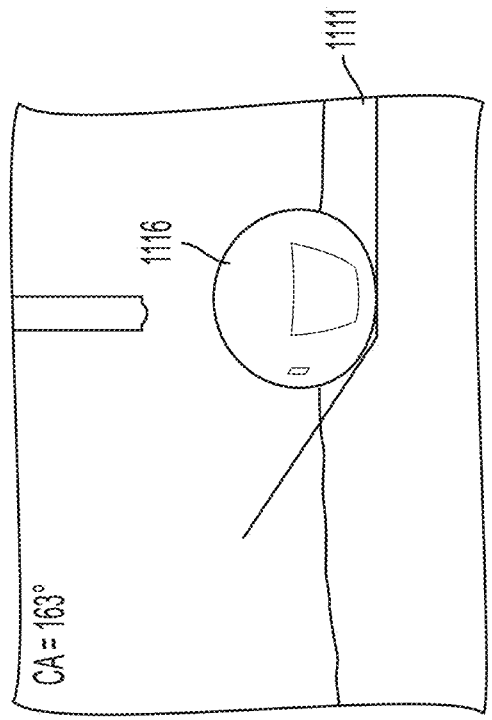
FIG. 11B illustrates the contact angle of water on terracotta with fluoro-functionalization, in accordance with certain embodiments.
Figure 11C:
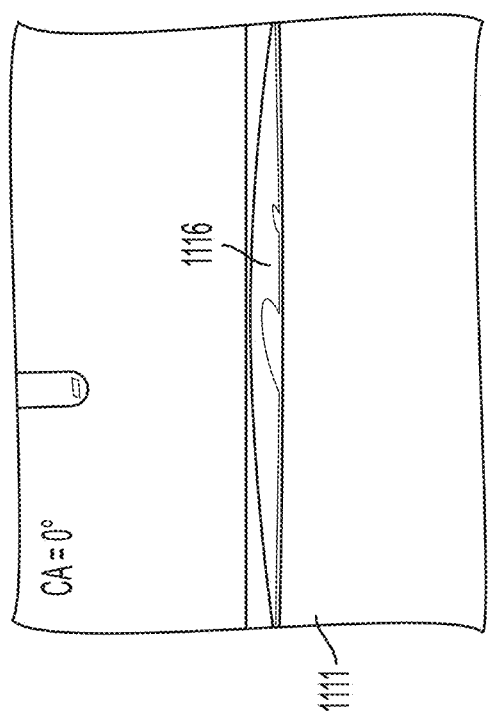
FIG. 11C illustrates the contact angle of water on terracotta with a nanoscale boehmite sol-gel coating and fluoro-functionalization, in accordance with certain embodiments.
Figure 11D:
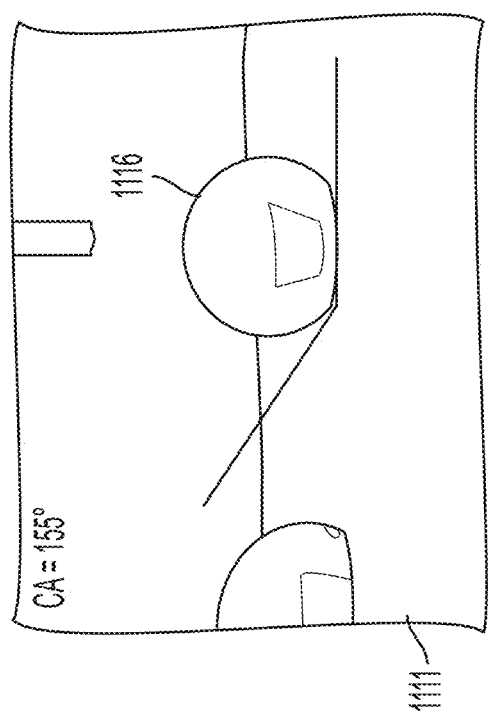
FIG. 11D illustrates the contact angle of water on terracotta with alumina nanoparticles and fluoro-functionalization, in accordance with certain embodiments.

However, in some embodiments, for example, in dry channels, the surface chemistry of an applied roughened layer can be modified with a hydrophobic chemical modification, including low surface energy materials or functional groups, to form a barrier layer that provides moisture resistance and minimizes interaction of liquid or water vapor with the surface. In some embodiments, hydrophobic chemical modification or chemical functionalization of roughened layers with nanoscale or microscale morphology can yield superhydrophobic behavior. A superhydrophobic surface exhibits a static contact angle in excess of 150° for a water droplet. As shown in FIGS. 11B-11D, chemical modification can lower the surface energy of a terracotta substrate 1111 and create a hydrophobic surface. FIG. 11B shows a droplet 1116 on a terracotta substrate 1111 with fluoro-functionalization. The contact angle between the fluoro-functionalized substrate and the droplet is 105°. FIG. 11C shows a droplet 1116 on a terracotta substrate 1111 with a sol-gel boehmite coating and fluoro-functionalization. The contact angle between the fluoro-functionalized boehmite coating and the water droplet 1116 is 155°. FIG. 11D shows a droplet 1116 on a terracotta substrate 1111 with intermixed alumina nanoparticles and fluoro-functionalization. The contact angle between the fluoro-functionalized, nanoparticle-containing terracotta and the water droplet 1116 is 163°. The combination of a low surface energy or hydrophobic chemical modification (e.g., fluoro-functionalization) and a nanoscale or microscale morphology (e.g., boehmite or nanoparticles) can yield superhydrophobic behavior beyond that of hydrophobic chemical modification alone. In some embodiments, the increased contact angle increases the capillary pressure required for wetting any pores present in the ceramic barrier layer, therefore further limiting the penetration of moisture from a wet channel in an IEC to a dry channel.

Figure 12:
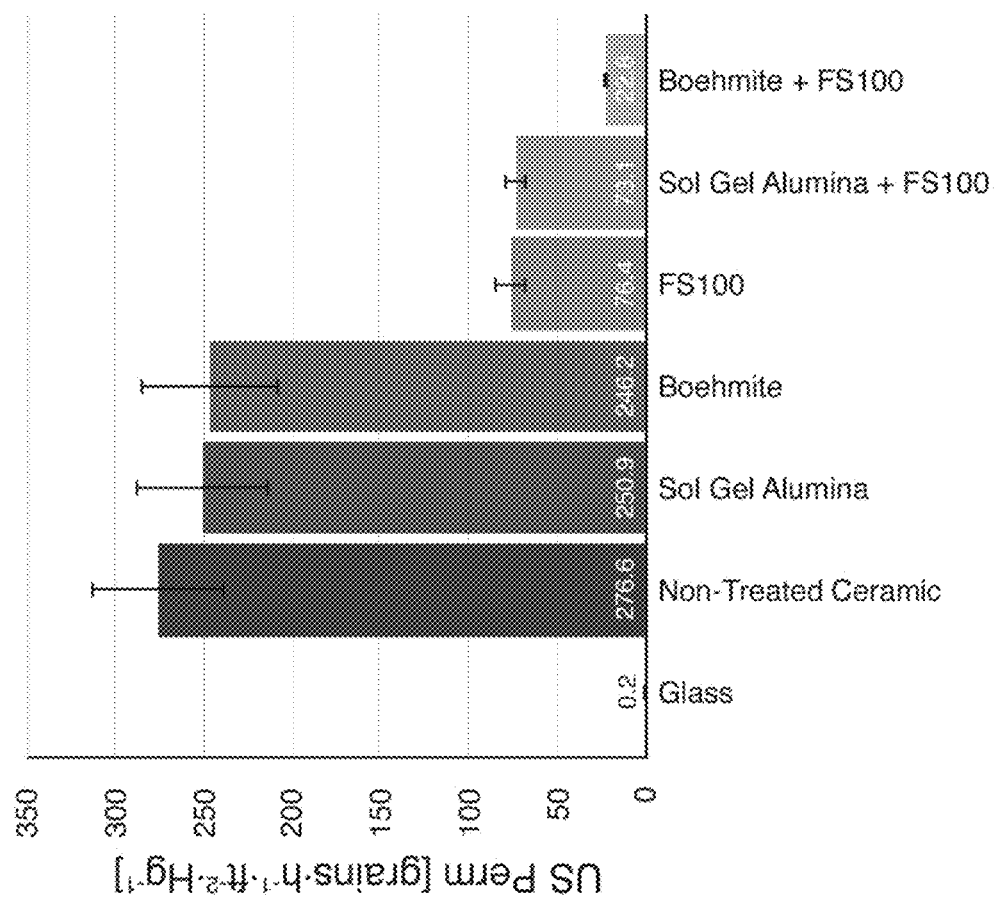
FIG. 12 illustrates water vapor permeance of glass, untreated ceramic, ceramic treated with sol-gel alumina, ceramic treated with boehmite, ceramic treated with chemical modification, ceramic treated with sol gel alumina and chemical modification, and ceramic treated with boehmite and chemical modification, in accordance with certain embodiments.

In some embodiments, shown in FIG. 12, the increased contact angle resulting from the hydrophobic chemical modification increases the capillary pressure required for wetting any pores present in the ceramic barrier coating, further limiting the penetration of moisture from a wet channel in an IEC to a dry channel with a superhydrophobic surface. The permeance of water was measured on glass, untreated ceramic substrates, ceramic substrates with sol-gel alumina coatings, ceramic substrates with boehmite coatings, ceramic substrates with fluoro-functionalization (FS100, Pilot Chemical Mason Fluorosurfactant FS-100, a fluoroalkyl phosphate ester), ceramic substrates with sol-gel alumina coatings and fluoro-functionalization, and ceramic substrates with boehmite coatings and fluoro-functionalization. As shown in FIG. 12, the permeance of untreated ceramic substrates, sol-gel alumina-coated ceramic substrates, and boehmite-coated ceramic substrates is high. In contrast, addition of fluoro-functionalization decreases the permeance of bare ceramic substrates, sol-gel alumina-coated ceramic substrates, and boehmite-coated substrates. In one embodiment, an exemplary hydrophobic sol-gel applied vapor barrier ("Boehmite+FS100") imparts more than a ten-fold reduction in water vapor permeance compared to an untreated (terracotta), as measured using ASTM E96. Indeed, a ceramic substrate with boehmite and fluoro-functionalization has a nearly three-fold reduction in water vapor permeance compared to a ceramic substrate with fluoro-functionalization alone.

In some embodiments, hydrophobic chemical modification can impart other favorable characteristics for the barrier layer, including, but not limited to, anti-bacterial, anti-fouling, anti-graffiti, and anti-scaling properties. In some embodiments, these properties can be achieved with a combination of surface modifiers or sequential functionalization steps.

In some embodiments, the increased contact angle of the hydrophobic chemical modification can also provide self-cleaning or easy-cleaning characteristics, which can preserve the visual appearance of the underlying ceramic and can be desirable for facade-integrated IECs.

In other embodiments, anti-fouling and self-cleaning surface properties of the hydrophobic chemical modification can reduce growth of harmful bacteria and mold, reducing the occurrence of sick building syndrome which is associated with both passive and active evaporative cooling systems. In some embodiments, anti-fouling, self-cleaning, and robust properties of the coating can reduce maintenance and replacement costs compared to other systems.

In some embodiments, exterior faces of ceramic heat-exchange elements can be treated with the superhydrophobic vapor barrier system to provide multiple benefits. In some embodiments, a superhydrophobic vapor barrier system can be used to impede the flow of vapor from the interior wetted surfaces of the ceramic heat-exchange elements to the exterior environment, reducing the amount of water lost to evaporation away from the wet channel. In these embodiments, additional evaporation can increase sensible cooling. In some embodiments, superhydrophobic surfaces reduce fouling, scaling, biofouling, and efflorescence on the exterior surfaces of the ceramic heat-exchange elements.

In some embodiments, the chemical modification is thin (e.g., 2 nm-1 μm), and chemical modification of the surface energy imparts beneficial mass transfer properties without introducing thermal resistance.

In some embodiments, physical adsorption or selective chemical reactions can be used for hydrophobic chemical modification of the roughened layer. In one embodiment, organic silane molecules terminated with hydrophobic methyl (such as trimethylsiloxytrichlorosilane), aryl (such as phenyltrimethoxysilane), branched or linear alkyl (such as trichloro(octadecyl)silane) or perfluorinated chains (such as 1H,1H,2H,2H-Perfluorooctyltriethoxysilane) or combinations thereof can be covalently attached to the roughened layer. In some embodiments, organic silanes can readily bind to surfaces bearing hydroxyl groups. In other embodiments, hydrophobicity can be achieved with covalent attachment of compounds, including, but not limited to, siloxanes (such as linear methyl-terminated or cyclic polydimethylsiloxane or fluoroalkyl disiloxane), alkyl-phosphates, alkyl phosphoric acid esters, alkane-phosphonic acids, alkane phosphonic esters, alkane-hydroxamic acids, alkane-carboxylic acids, thiols, and combinations thereof. In other embodiments, the surface energy can be modified via physical adsorption of molecular species. Non-limiting examples of molecular species include fatty acids (such as stearic acid, palmitic acid, and myristic acid), natural waxes (such as beeswax, carnauba wax, and lanolin), synthetic waxes (such as castor wax, ceresin, and paraffin wax) and combinations thereof.

Non-limiting examples of methods to apply hydrophobic chemical modification include evaporation, vacuum sublimation, spray drying, or immersion in dilute solution of the desired surface modifier. In some embodiments, adsorption (e.g., physisorption or chemisorption) of a solute from a solvent can be an effective means of achieving uniformly-coated surfaces, allowing intermolecular forces to aid in the assembly of the adsorbate on the surface.

IV. EXAMPLES

Certain embodiments will now be described in the following non-limiting examples.

A. Single Stage Evaporative Cooling System

Figure 13:
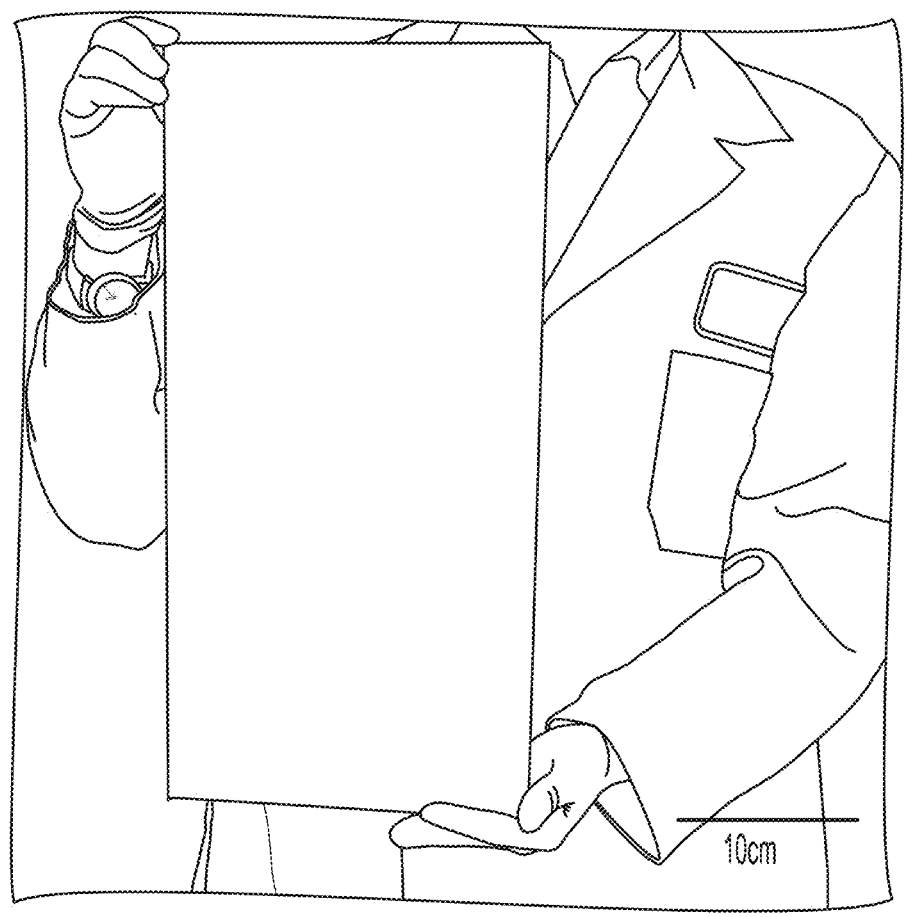
FIG. 13 illustrates a single-stage indirect evaporative cooling panel, in accordance with certain embodiments.
Figure 14:
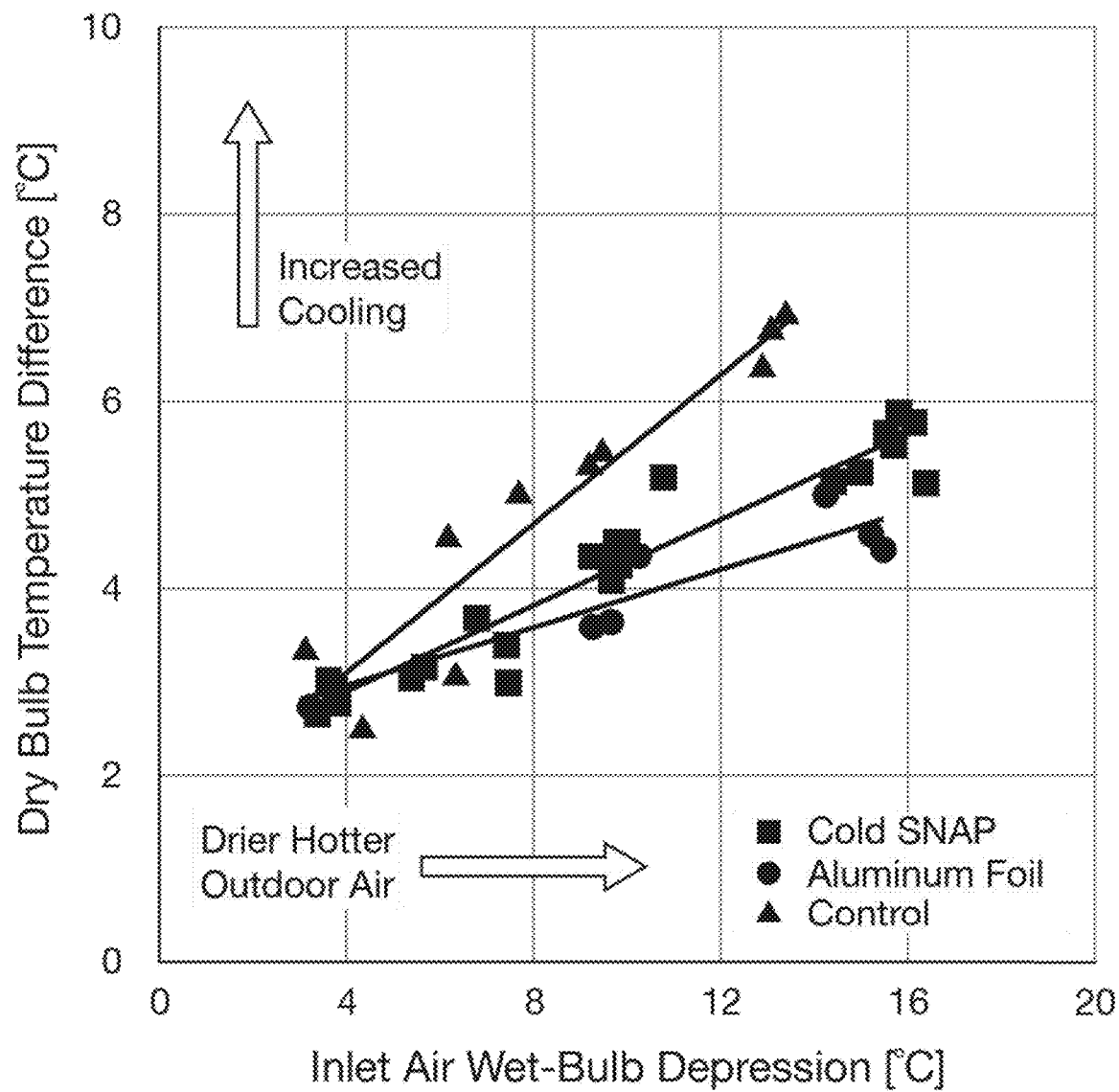
FIG. 14 illustrates the difference in temperature between inlet air flow and outlet product air, as measured by inlet air wet-bulb depression and dry bulb temperature difference, respectively, in accordance with certain embodiments.
Figure 15:
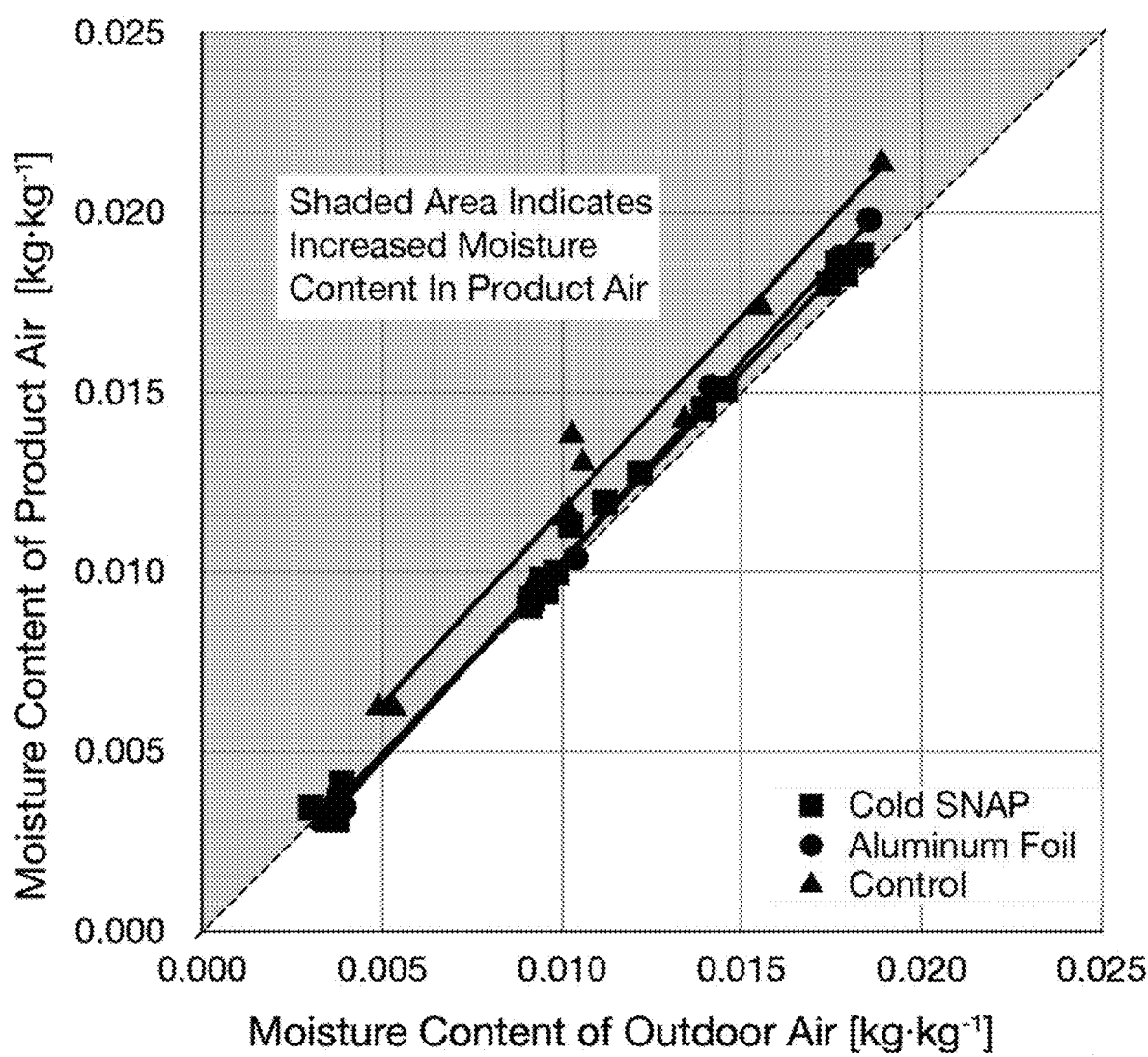
FIG. 15 illustrates the inlet air moisture content and the product air moisture content of untreated control ceramic tiles, tiles with a hydrophobic sol-gel applied vapor barrier (cold SNAP), and tiles coated with aluminum foil in a parallel flow configuration, in accordance with certain embodiments.

FIG. 13 shows a single-stage indirect evaporative cooling panel with one wet channel, approximately 0.01 m by 0.2 m by 0.05 m, and one dry channel approximately 0.01 m by 0.2 m by 0.05 m. FIGS. 14-15 show experimental data for this single stage indirect evaporative cooling panel.

FIG. 14 shows experimental data for cooling of this evaporative cooling panel. The inlet air wet-bulb depression and dry bulb temperature difference were measured for systems with a superhydrophobic sol-gel coating (cold SNAP (superhydrophobic nano-architectured process)), aluminum foil, and untreated ceramic (control) panels. Aluminum foil can create a physical barrier to inhibit vapor flow. The dry bulb temperature difference is the difference between inlet air flow and outlet product air. As outdoor air temperature increases and/or outdoor humidity decrease, the cooling capacity increases, indicated by increase in the dry bulb temperature difference. Among samples tested, the untreated ceramic panel has the highest amount of cooling because of the increased moisture content. However, the superhydrophobic sol-gel coating shows an increased dry-bulb depression over an aluminum foil sample. This result indicates a potential increase in total cooling for a superhydrophobic sol-gel coating compared to a standard foil vapor barrier.

FIG. 15 shows experimental data for outdoor inlet air moisture content and the outlet product air moisture content of various ceramic tiles in parallel flow configuration. Untreated ceramic ("Control") experiences increased moisture content in product air stream resulting from water evaporation and the absence of a barrier layer. The hydrophobic roughened sol-gel applied vapor barrier layer ("Cold SNAP") provides an effective water-impermeable interface, as demonstrated by the near-constant moisture content for the inlet and outlet product air streams while the untreated control has an approximately 25% increase in moisture content, indicated by the data, which are above the dotted 1-to-1 line. Combined with the cooling data, shown in FIG. 14, the near-constant moisture content at the inlet and outlet of the hydrophobic roughened sol-gel applied vapor barrier layer shows that the hydrophobic roughened sol-gel applied vapor barrier layer can resist vapor mass transfer, resulting in no added humidity to the product stream, while also increasing sensible heat transfer when compared to a standard vapor barrier layer, the aluminum foil.

B. Characterization of Nanoscale Roughened Layer

FIGS. 16A-16C show SEM images of a roughened layer. FIG. 16A shows an untreated terracotta tile. FIG. 16B shows a terracotta tile with a sol-gel boehmite coating with nanoscale roughness. FIG. 16C shows a terracotta tile with an alumina nanoparticle dispersion. Both the sol-gel boehmite coating the alumina nanoparticle dispersion add nanoscale roughness to the porous ceramic material.

C. Downdraft Indirect Evaporative Cooling Façade or Roof Systems

Figures 17A, 17B:
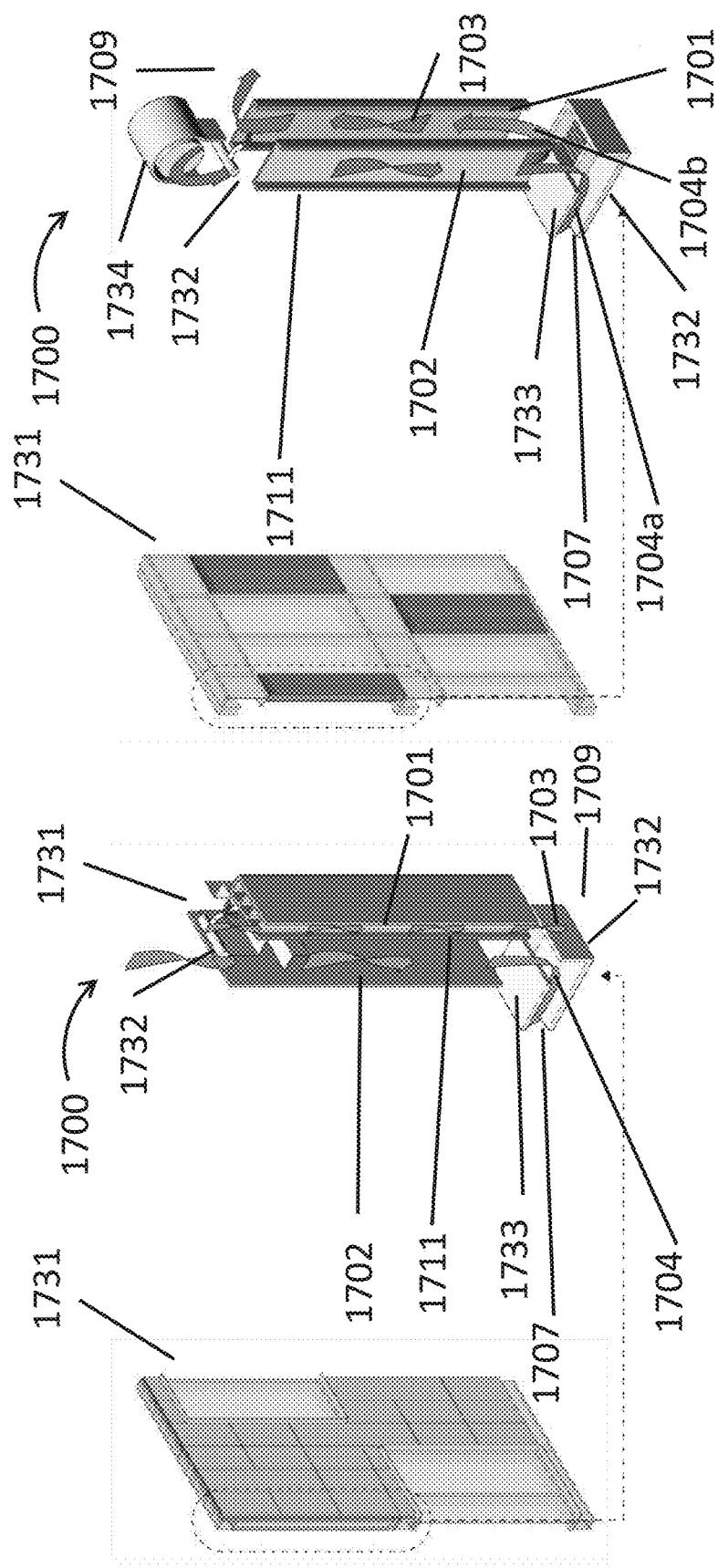
FIG. 17A shows a schematic of a downdraft indirect evaporative cooling facade or roof system, in accordance with certain embodiments.
FIG. 17B shows a regenerative indirect evaporative cooling façade or roof system, in accordance with certain embodiments.

In some embodiments, shown in FIG. 17A, a downdraft indirect evaporative cooling façade or roof system 1700 can include three components: (1) a ceramic heat-exchange element 1711 (2) a vapor barrier layer selectively applied to the ceramic heat-exchange elements to separate dry and wet channels; (3) manifold unit(s) 1733 with a sump, water-pump 1732, spray nozzle, fan or combination thereof. In some embodiments, the ceramic heat-exchange element can include one or more channels in a parallel, regenerative, or other configurations which are arrayed across a selected area of a building façade 1731 or roof. In some embodiments, the location of the ceramic heat-exchange element can be based on anticipated cooling loads and fresh air supply requirements.

In some embodiments, the ceramic heat-exchange elements can include an array of channels or plates (surfaces) in the vertical direction. In some embodiments, the length of the ceramic heat-exchange elements in the vertical direction can be from 10 mm to 2000 mm. In some embodiments, these heat-exchange elements can be connected to form longer continuous vertical sections using a gasket, tubing, sleeve or other vapor impervious connections. In some embodiments, the spacing of the channels or plates in the horizontal direction can be from 1 mm to 100 mm on center. In some embodiments, the channel wall or plate thickness can be from 500 µm to 30 mm.

In some embodiments, the ceramic heat-exchange elements (and associated pumps, manifolds, and blowers) can be attached to the exterior sheathing of building wall or roof. Non-limiting means of attaching include framing, standoffs, tracks, and other structural systems. In some embodiments, the ceramic heat-exchange elements can be fastened to the structural systems using clips, ties, screws, or other mechanical means. In some embodiments, the structural system and mechanical fasteners can include a vapor impervious or non-reactive material. Non-limiting examples of a vapor impervious or non-reactive material include aluminum, stainless steel, galvanized steel, painted mild steel, polymers, and combinations thereof. In some embodiments, the sheathing of the wall or roof can be coated with a vapor impervious sheet, paint, or other membrane system. In some embodiments, the structural systems can produce a cavity or space between the building wall or roof sheathing and ceramic heat-exchange elements from 1 mm to about 200 mm.

In some embodiments, the surface of ceramic heat-exchange elements facing the wall cavity can be treated with the superhydrophobic vapor barrier layer.

In one embodiment, the superhydrophobic vapor barrier layer can be achieved through application of a liquid formulation to a fully fired ceramic body. As a model superhydrophobic vapor barrier layer, metal-oxide sol-gel (alumina) is presented as a potential low-cost coating material for ceramics. The barrier layer coating can be applied using a sol-gel process at a controlled penetration depth in the liquid state through various scalable means including, but not limited to, dipping, painting, and spraying. After application, the nanoscale roughness can be achieved through a simple, non-toxic hydrothermal reaction that converts alumina to alumina oxyhydroxide or boehmite. Following this reaction, the surface energy of the boehmite can be lowered by functionalization with an alkane- or fluoroalkyl-terminated phosphate ester to increase liquid repellency. The liquid or vapor application of the chemical modification selectively binds to the metal-oxide sites of the barrier layer, leaving the surrounding bulk ceramic hydrophilic.

In another embodiment, the superhydrophobic vapor barrier layer can be achieved through the addition of a 20% by weight dispersion of metal-oxide nanoparticles (NP), such as alumina, to a non-fired ceramic. In some embodiments, the range of particle sizes is from about 2 nm to 20 µm. In this embodiment, the intrinsic composition and morphology of the NP provides the necessary roughness and site for subsequent surface chemical modification. The NPs can be integrated prior to shaping of the ceramic body in the dry mix, slip, or plastic phases. This method allows for selective patterning of NP within a continuous clay body through common manufacturing methods such as co-extrusions, pressing, co-injection, or multi-material additive manufacturing. Once shaped, the clay body with integrated NP can be fired without loss of nano- or micro-scale roughness. Once fired, the surface energy of the NP can be lowered by functionalization with an alkane- or fluoroalkyl-terminated phosphate ester to increase liquid repellency. The liquid or vapor application of the chemical modification selectively binds to the metal-oxide sites, leaving the surrounding bulk ceramic hydrophilic.

In some embodiments, the combination of wall or roof sheathing with vapor barrier layer and the ceramic heat-exchange element with a superhydrophobic vapor barrier layer can form the dry channel of an indirect evaporative cooling system. In contrast, the untreated channels or plates remain hydrophilic and form the wet channels of the indirect evaporative cooling system.

In some embodiments, the interior surfaces of the wet channels or plates can be wetted by capillary forces or by mechanical pump and sprayer. In embodiments where the wet channels or plates are wetted capillary forces, the bottom edge of ceramic heat-exchange elements are in contact with or submerged within a water sump or collection area. In these embodiments, the capillary forces within the porous ceramic draw water up the interior face of the channel or plate and water is evaporated. Make-up water can be supplied to the sump using the building plumbing system, rainwater collection, or other means. In embodiments where the channels or plates are wetted by a mechanical pump and sprayer, the interior surface of the ceramic heat-exchange elements can be wetted by a water pump with tubes, misters, ultrasonic misters, atomizing spray nozzles, or other spray nozzles placed at the top of ceramic heat-exchange elements. In this embodiment, the ceramic heat-exchange elements can then be wetted through gravitational absorption. In some embodiments, un-evaporated and run-off water can be collected in a sump or other collection area. In some embodiments, water from the sump is then recirculated to the spray nozzles. In some embodiments, make-up water is supplied to the sump using the building plumbing system, rainwater collection, or other means.

In some embodiments, hydrophilic channels or plates of the ceramic heat-exchange elements can be composed of multiple channels or plates arrayed in the horizontal direction, perpendicular to the wall or roof, to form a matrix of multiple channels. In this embodiment, the exterior channels can be wetted and used for evapotranspiration and cooling. In other embodiments, the exterior channels can act as an air-gap to impede or promote convective flows that reduce heat fluxes acting on the exchange media, or provide self-shading. Self-shading can provide insulation from solar radiation.

In some embodiments, product air is flowed across the dry channel 1702 or cavity and into the target building space or exterior space by means of negative pressure generated through natural buoyancy and/or wind-driven ventilation or by means of mechanical fan located within the target space. In other embodiments, an inlet duct is placed within the building wall or roof. In some embodiments, the flow of product air through the inlet duct can be controlled by means of a grill. In some embodiments, a manifold or cap is placed at the bottom of the cavity to prevent backflow.

Working air flowed across the wet channels 1701 is driven by wind or buoyancy-driven flows and kept separate from the dry 1702 channel duct by means of a manifold 1733 or cap at the end of the dry channel.

In some embodiments, a tangential, crossflow, or direct blower fan or pump 1732 can be placed at the top of the assembly. In some embodiments the blower fan can be used to positively pressurize the dry channel 1702 or cavity and flow product air 1704 into the target space by means of a ducted inlet and channel cap to prevent loss of pressure. The wet channels 1701 can use wind or buoyancy driven ventilation to flow working air 1703 through the channels or across the plates. In other embodiments, the blower fan can be used to positively pressurize the dry and wet channels. In this embodiment, shown in FIG. 17A, the product air 1704 in the dry channel 1702 flows into the building through a ducted systems 1707 while the working air 1703 in the wet channel 1701 is exhausted to the exterior environment 1709.

D. Regenerative Indirect Evaporative Cooling Facade or Roof System

In some embodiments, shown in FIG. 17B, a regenerative indirect evaporative cooling façade or roof system 1700 can include three components: (1) a ceramic heat-exchange element 1711 (2) a vapor barrier layer selectively applied to the ceramic heat-exchange elements to separate dry and wet channels; (3) manifold unit(s) 1733 with a sump, water-pump 1732, spray nozzle, fan 1734 or combination thereof. In some embodiments, the ceramic heat-exchange element can include one or more channels in a parallel, regenerative, or other configurations which are arrayed across a selected area of a building façade 1731 or roof. In some embodiments, the location of the ceramic heat-exchange element can be based on anticipated cooling loads and fresh air supply requirements.

In some embodiments, the ceramic heat-exchange elements are generally composed an array of channels or plates (surfaces) in parallel, counter-flow, cross-flow, regenerative, dewpoint, or M-cycle-configurations. In some embodiments, the length of the ceramic heat-exchange elements in the vertical direction can be from 10 mm to 2000 mm. In some embodiments, these heat-exchange elements can be connected to form longer continuous vertical sections using a gasket, tubing, sleeve or other vapor impervious connections. In some embodiments, the spacing of the channels or plates in the horizontal direction can be from 1 mm to 100 mm on center. In some embodiments, the channel wall or plate thickness can be from 500 µm to 30 mm.

In some embodiments, the dry channels of the ceramic heat-exchange element are formed through spatial-selective treatment with a superhydrophobic vapor barrier layer. In contrast, the wet channels remain untreated and superhydrophilic and form the wet channels of the indirect evaporative cooling system.

In one embodiment, the superhydrophobic vapor barrier layer can be achieved through application of a liquid formulation to a fully fired ceramic body. As a model superhydrophobic vapor barrier layer, metal-oxide sol-gel (alumina) is presented as a potential low-cost coating material for ceramics. The coating can be applied using a sol-gel process at a controlled penetration depth in the liquid state through various scalable means including, but not limited to, dipping, painting, and spraying. After application, the nanoscale roughness can be achieved through a simple, non-toxic hydrothermal reaction that converts alumina to alumina oxyhydroxide or boehmite. Following this reaction, the surface energy of the boehmite can be lowered by functionalization with an alkane- or fluoroalkyl-terminated phosphate ester to increase liquid repellency. The liquid or vapor application of the chemical modification selectively binds to the metal-oxide sites, leaving the surrounding bulk ceramic hydrophilic.

In another embodiment, the superhydrophobic vapor barrier layer can be achieved through the addition of a 20% by weight dispersion of metal-oxide nanoparticles (NP), such as alumina, with a range of particle sizes from about 1 nanometers to 10 micrometers, to a non-fired ceramic. In this embodiment, the intrinsic composition and morphology of the NP provides the necessary roughness and site for subsequent surface chemical modification. The NPs can be integrated prior to shaping of the ceramic body in the dry mix, slip, or plastic phases. This method allows for selective patterning of NP within a continuous clay body through common manufacturing methods such as co-extrusions, pressing, co-injection, or multi-material additive manufacturing. Once shaped, the clay body with integrated NP can be fired without loss of nano/micro-scale roughness. Once fired, the surface energy of the NP can be lowered by functionalization with an alkane- or fluoroalkyl-terminated phosphate ester to increase liquid repellency. The liquid or vapor application of the chemical modification selectively binds to the metal-oxide sites, leaving the surrounding bulk ceramic hydrophilic.

The ceramic heat-exchange elements (and associated pumps, manifolds, and blowers) are attached to the exterior sheathing of building wall or roof using framing, standoffs, tracks, or other structural systems. The ceramic heat-exchange elements are fastened to the structural systems using clips, ties, screws, or other mechanical means.

In some embodiments a channel, fins, or other geometry can be incorporated into the exterior face of the ceramic heat-exchange elements. In some embodiments, these geometries can act as an air-gap to impede or promote convective flows that act to reduce heat fluxes acting on the exchange media, or to provide self-shading. Self-shading can provide insulation from solar radiation.

In some embodiments, the interior surfaces of the wet channels or plates can be wetted by capillary forces or by mechanical pump and sprayer. In embodiments where the wet channels or plates are wetted capillary forces, the bottom edge of ceramic heat-exchange elements are in contact with or submerged within a water sump or collection area. In these embodiments, the capillary forces within the porous ceramic draw water up the interior face of the channel or plate and water is evaporated. Make-up water can be supplied to the sump using the building plumbing system, rainwater collection, or other means. In embodiments where the channels or plates are wetted by a mechanical pump and sprayer, the interior surface of the ceramic heat-exchange elements can be wetted by a water pump with tubes, misters, ultrasonic misters, atomizing spray nozzles, or other spray nozzles placed at the top of ceramic heat-exchange elements. In this embodiment, the ceramic heat-exchange elements can then be wetted through gravitational absorption. In some embodiments, un-evaporated and run-off water can be collected in a sump or other collection area. In some embodiments, water from the sump is then recirculated to the spray nozzles. In some embodiments, make-up water is supplied to the sump using the building plumbing system, rainwater collection, or other means.

In some embodiments, shown in FIG. 17B, product air 1704 and working air 1703 can be supplied to the wet and dry channels using a tangential, crossflow, or direct blower fan. In some embodiments, a manifold can be used to direct the flow of air between the dry channels 1702 and wet channels 1701.

In some embodiments, a manifold at the dry channel outlet directs product air into the building, target space, or exterior space through a ducted system place within the building wall or roof. In this embodiment, the manifold exhausts the working air at the outlet of the wet channel to the exterior environment 1709.

In another embodiments, shown in FIG. 17B, a manifold 1733 at the dry channel 1702 outlet directs a portion of product air 1704a into the building, target space, or exterior space through a ducted system 1707 within the building wall or roof and a portion of the product air 1704b is redirected as pre-cooled working air 1703 for the wet channel 1701. In this embodiment, this manifold or another manifold exhausts the working air at the outlet of the wet channel to the outside.

In some embodiments the regenerative indirect evaporative cooling façade or roof system is installed within a roof or wall system such that the exterior face of the ceramic heat exchange system is exposed to the interior space. In this embodiment, additional cooling through radiant heat exchange with the interior walls, equipment, and occupants further increases the cooling capacity of the regenerative indirect evaporative cooling.

B. Indirect Evaporative Cooling Media For Stand-Alone Units.

In some embodiments, a stand-alone indirect evaporative cooling system can include three components: (1) a ceramic heat-exchange element (2) a vapor barrier layer selectively applied to the ceramic heat-exchange elements to separate dry and wet channels; (3) manifold unit(s) with a sump, water-pump, spray novel, fan or combination thereof. In some embodiments, the ceramic heat-exchange element can include one or more channels in other geometries in parallel-, counterflow-, regenerative-, dewpoint, or M-cycle-exchanger configurations within an insulated, air-tight, and environmentally protective housing.

In some embodiments, the working and product airflow through the ceramic heat exchange media is generated by positive pressure from a blower fan attached to the channels, manifold or housing of the IEC system. In some embodiments, the air is separated between the dry and wet channels by manifolds. In some embodiments, product air flows directly from the dry channel into the building or exterior space by means of a duct placed through the wall, roof, other building component while the wet channel air is exhausted outside the building. In some embodiments, such as regenerative-, dewpoint-, and M-cycle-IEC system the dry channel air can be separated before entering the building or exterior space by means of a manifold or periodic outlets and redirected into the wet channel where it is then exhausted outside the building. In some embodiments, flow valves are used to control outlet air flow and/or to mix untreated outdoor air with treated product air.

In some embodiments, water is supplied to and wets the surfaces of the wet channels by means of a pump with sprayer nozzle. Or, the channels are wetted by means of capillary forces when the wet channels are placed in a water filled sump. Or, the exchange media is wetted by filling the entire housing and submerging the ceramic media, filling its pore structure. In this case waster is removed and the process continues when the ceramic media dries. Un-evaporated and run-off water is collected in a sump below the wet channels. Water from the sump is then recirculated to the spray nozzles. Make-up water is supplied to the sump using the building plumbing system, rainwater collection, or other means. Flow valves are used to control water flow.

In some embodiments a stand-alone indirect evaporative cooling unit is installed within a target cooling space in such a way that the exterior face or faces of the ceramic heat exchange system are exposed to the interior space. In this embodiment, additional cooling through radiant heat exchange with the interior walls, equipment, and occupants further increases the cooling capacity of the stand-alone indirect evaporative cooling unit. In some embodiments, a stand-alone indirect evaporative cooling unit is installed in an exterior space.

C. Additive Manufacturing

Figure 18B:
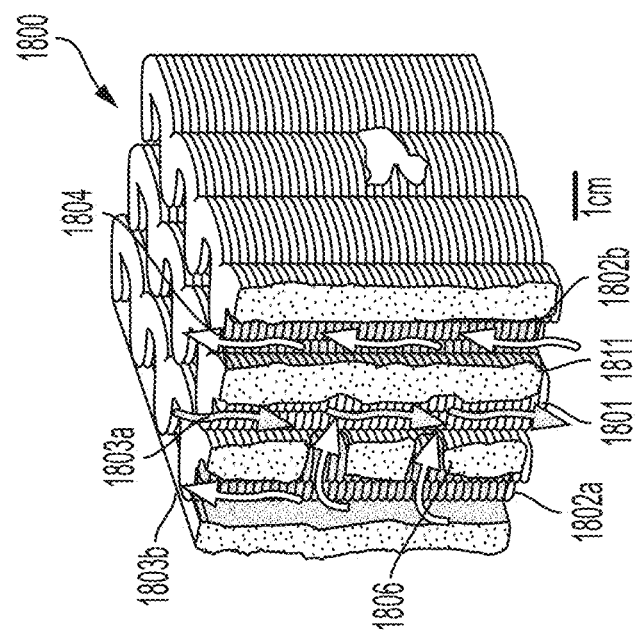
FIG. 18B shows a schematic of an evaporative cooling system made by additive manufacturing, in accordance with certain embodiments.
Figure 18A:
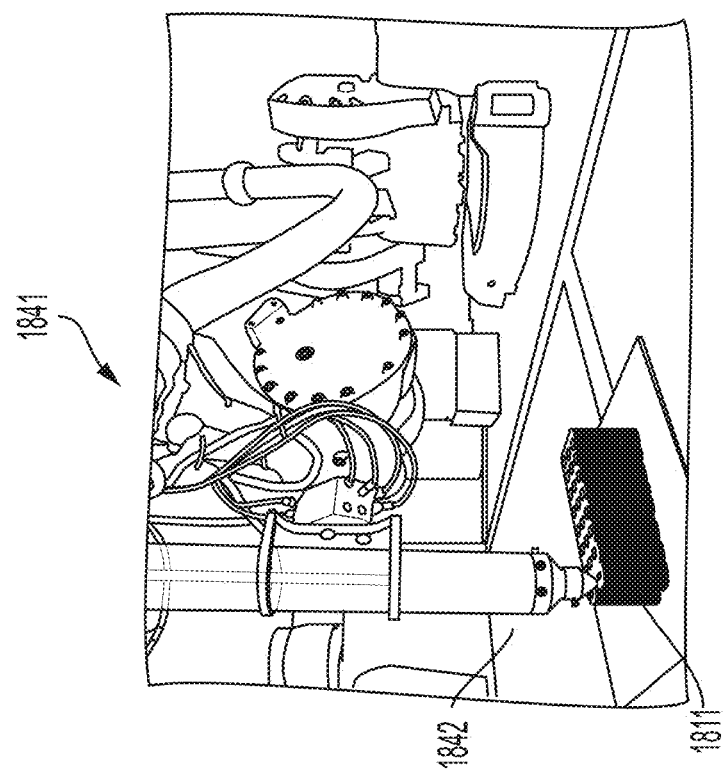
FIG. 18A shows a photograph of an additive manufacturing system used to make an evaporative cooling system, in accordance with certain embodiments.

FIGS. 18A-18B show a method of making an evaporative cooling system 1800 using additive manufacturing. As shown in FIG. 18A, a porous ceramic body 1811 can be formed using a 3D-printing system 1841. Clay is extruded through an extrusion head 1842 as the extrusion head moves in a predetermined path to deposit the clay layer-by-layer to form a three-dimensional porous ceramic body 1811. As shown in FIGS. 18A-18B, the resulting porous ceramic body includes a plurality of parallel, vertical channels. A metal oxide barrier layer and chemical modification can be selectively applied to a portion of these channels to form dry channels 1802a, 1802b. Any untreated channels remain hydrophilic and can serve as wet channels 1801.

In some embodiments a porous ceramic body 1811 can be formed using a 3D-printing system 1841 with multiple extrusion nozzles, heads, or similar end-effectors to extrude multiple clay bodies with varying clay formulations within a continuous three-dimensional porous ceramic body 1811. In some embodiments, one of these clay formulations can have roughened layer components, such as a dispersion of alumina nano-particles, homogeneously mixed within it, while a second clay formulation has no roughened layer components and exhibits high porosity. The two clay formulations can be extruded through separate extrusion heads, or mixed within a single extrusion head as the extrusion heads moves in a predetermined path to deposit the clay layer-by-layer. In some embodiments, two or more clay formulations can be simultaneously extruded, mixed to varying degrees of each formulation (e.g., 30% formulation one, 70% formulation two) and extruded, extruded as separate paths, extruded in a binary-like pattern wherein the path extrudes one formulation along a discrete section of the path, then extrudes the another formulation along a separate discrete section of the path. As shown in FIGS. 18A-18B, the resulting porous ceramic body includes a plurality of parallel, vertical channels. A chemical modification can be selectively applied to a portion of these channels, or applied to the whole three-dimensional porous ceramic body to form dry channels 1802a, 1802b. Any channels or portions of the three-dimensional porous ceramic body extruded from a clay formulation without barrier layer components remain hydrophilic and can serve as wet channels 1801.

FIG. 18B shows a Maisotsenko-like Indirect Evaporative Cooling System 1800 (M-IEC) formed by the 3D-printed process shown in FIG. 18A. The 3D-printed cooling system includes one or more wet heat exchange channels 1801 flowing a secondary working air 1803a in contact with water, one or more dry heat exchange channels 1802a with dry working air 1803b that is being sensibly cooled, and one or more dry heat exchange channels 1802b with a primary product air 1804 that is being sensibly cooled. Heat from the dry working 1803b and primary product air 1804 is transferred through the porous ceramic 1811 to the wet channels 1801 and absorbed by the water as latent heat. The water evaporates and diffuses into the secondary wet working air 1803a in the wet channels. Air flows from multiple inlets to (1) dedicated dry channel 1802a with multiple outlet passages forming inlets 1806 to the wet channel 1801 and (2) primary air dry channels 1802b with outlets to the conditioned space. The wet working air 1803a can be exhausted out of the building or space to be cooled, while the dry product air 1804 is brought into the building or space to be cooled. Since the air entering the wet channel 1801 from the dedicated dry channel inlets 1806 has already been cooled, this air has a lower wet-bulb temperature than the original inlet air flow. Therefore, the dry working air 1803b in the primary dry channels 1802a can be cooled to a lower dry-bulb temperature, below the wet-bulb temperature of the primary air flow at the inlet, near dew point. In some embodiments, the moisture content of the primary product air remains constant while the moisture content of the working air isothermally increases at each inlet from the dedicated dry working air. One benefit of M-IEC is that the primary product air is cooled near dew-point temperature without increasing the moisture content.

It will be appreciated that while one or more particular materials or steps have been shown and described for purposes of explanation, the materials or steps can be varied in certain respects, or materials or steps can be combined, while still obtaining the desired outcome. Additionally, modifications to the disclosed embodiment and the invention as claimed are possible and within the scope of this disclosed invention.

The invention claimed is:

1. An evaporative cooling system comprising:
   a porous ceramic body comprising
      a plurality of dry channels configured to inhibit transfer of water vapor into the dry channels and comprising a roughened layer with a features size less than 1000 nm and a hydrophobic chemical modification disposed on the roughened layer; and
      a plurality of wet channels configured to allow transfer of water vapor,
   wherein the porous ceramic body has a pore volume of 1 to 80 percent.

2. The evaporative cooling system of claim 1, wherein the plurality of dry channels and the plurality of wet channels have a configuration selected from the group consisting of parallel-flow, counter-flow, and cross-flow.

3. The evaporative cooling system of claim 1, wherein the evaporative cooling system is an indirect evaporative cooling system.

4. The evaporative cooling system of claim 1, wherein the porous ceramic body is selected from a group consisting of oxides, composites, clay bodies, stoneware, earthenware, porcelain, bone china, and combinations thereof.

5. The evaporative cooling system of claim 1, wherein the porous ceramic body has a pore size between 10 nm and 1000 nm.

6. The evaporative cooling system of claim 1, wherein the roughened layer has a roughness between 0.1 nm and 1000 nm.

7. The evaporative cooling system of claim 1, wherein the roughened layer is selected from the group consisting of alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide, aluminum oxyhydroxide, and combinations thereof.

8. The evaporative cooling system of claim 1, wherein the roughened layer comprises a sol-gel coating or a dispersion of metal oxide particles.

9. The evaporative cooling system of claim 8, wherein the metal oxide particles have a diameter of 2 nm to 20 μm.

10. The evaporative cooling system of claim 1, wherein the roughened layer has a thickness of 100 nm to 5 mm.

11. The evaporative cooling system of claim 1, wherein the hydrophobic chemical modification is selected from the group consisting of organic silane and thiol molecules, wherein the organic silane or thiol molecules are terminated with either methyl groups, aryl groups, branched alkyl chains, linear alkyl chains, perfluorinated chains, or hydrophobic polymers, siloxanes, alkyl-phosphates, alkyl phosphoric acid esters, alkane-phosphonic acids, alkane-phosphonic esters, alkane-hydroxamic acids, alkane-carboxylic acids, fatty acids, natural waxes, synthetic waxes, and combinations thereof.

12. The evaporative cooling system of claim 1, wherein the hydrophobic chemical modification is covalently attached or adsorbed to the roughened layer.

13. The evaporative cooling system of claim 1, wherein the evaporative cooling system is integrated into at least one of an exterior wall of a building, a roof of a building, and an interior of a building.

14. A method of making an evaporative cooling system comprising:
   providing a porous ceramic body, wherein providing the porous ceramic body comprises forming the ceramic according to a method selected from the group consisting of extrusion, co-extrusion, pressing, casting, foaming, additive manufacturing, and multi-material additive manufacturing,
   forming a roughened layer with a feature size less than 1000 nm within a first region of the porous ceramic body, and
   chemically modifying the roughened layer within the first region.

15. The method of claim 14, further comprising forming the roughened layer within a second region of the porous ceramic body.

16. The method of claim 14, wherein the roughened layer is selected from the group consisting of alumina, silica, titania, beryllia, ceria, zirconia, cupric oxide, cuprous oxide, barium oxide, germanium oxide, yttria, strontium oxide, hafnium oxide, magnesium oxide, niobium oxide, tin oxide, tantalum oxide, tungsten oxide, aluminum oxyhydroxide, and combinations thereof.

17. The method of claim 14, wherein said forming the roughened layer comprises:
   dissolving a sol-gel precursor in an organic solvent,
   initiating a hydrolysis reaction to form a network gel,
   applying the network gel to the porous ceramic body, and
   heating the porous ceramic body.

18. The method of claim 16, wherein said forming the roughened layer further comprises providing metal oxide particles.

19. The method of claim 18, further comprising providing the metal oxide particles in the sol-gel precursor before dissolving the sol-gel precursor in the organic solvent.

20. The method of claim 18, further comprising providing the metal oxide particles in the sol-gel precursor after dissolving the sol-gel precursor in the organic solvent.

21. The method of claim 18, further comprising providing the metal oxide particles during the hydrolysis reaction.

22. The method of claim 17, further comprising densifying and recrystallizing the network gel by a hydrothermal reaction.

23. The method of claim 16, wherein said forming the roughened layer comprises applying a dispersion of metal oxide particles to the porous ceramic body.

24. The method of claim 14, wherein said chemically modifying the roughened layer comprises covalently attaching a molecule to the roughened layer or adsorbing a molecule to the roughened layer.

* * * * *